United States Patent
Kawasaki et al.

(10) Patent No.: US 9,950,618 B2
(45) Date of Patent: Apr. 24, 2018

(54) CONTROLLER OF FOUR-WHEEL DRIVE VEHICLE

(71) Applicant: MITSUBISHI JIDOSHA KOGYO KABUSHIKI KAISHA, Tokyo (JP)

(72) Inventors: Tomohiro Kawasaki, Tokyo (JP); Takayuki Wako, Tokyo (JP); Atsuro Hirayama, Tokyo (JP); Tomo Kato, Tokyo (JP); Wataru Tanabe, Tokyo (JP); Shuichi Yoshida, Tokyo (JP); Kei Asano, Tokyo (JP); Yutaka Kohara, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 255 days.

(21) Appl. No.: 14/989,020

(22) Filed: Jan. 6, 2016

(65) Prior Publication Data

US 2016/0243939 A1 Aug. 25, 2016

(30) Foreign Application Priority Data

Feb. 20, 2015 (JP) .................................. 2015-031907
Feb. 20, 2015 (JP) .................................. 2015-031908

(51) Int. Cl.
*B60W 10/14* (2012.01)
*B60W 10/184* (2012.01)
(Continued)

(52) U.S. Cl.
CPC ............ *B60K 23/08* (2013.01); *B60K 17/348* (2013.01); *B60K 23/0808* (2013.01);
(Continued)

(58) Field of Classification Search
CPC .. B60W 10/14; B60W 10/184; B60W 50/082; B60K 23/08; B60K 2023/0841
See application file for complete search history.

(56) References Cited

U.S. PATENT DOCUMENTS 6,481,304 B1 11/2002 Yoshioka et al.
6,487,486 B1 * 11/2002 Anderson .............. B60K 23/04
701/69

(Continued)

FOREIGN PATENT DOCUMENTS

JP 2000-247159 A 9/2000
JP 2010-149850 A 7/2010

OTHER PUBLICATIONS

Extended European Search Report dated Jul. 22, 2016 issued in the correspoding European Application No. 16156455.4.

*Primary Examiner* — Edwin A Young
(74) *Attorney, Agent, or Firm* — Birch, Stewart, Kolasch & Birch, LLP

(57) ABSTRACT

A controller of a four-wheel drive vehicle includes a first operation part that switches drive mode of the vehicle; a second operation part that switches off-road traveling modes indicating traveling modes for off-road driving of the vehicle; a transfer controller that controls the arrangement of a transfer device in accordance with the drive mode; a detector that detects the arrangement of the transfer device; a determiner that determines whether a switching of the traveling modes is permitted or not based on the drive mode and the arrangement detected by the detector; and a setter that sets the traveling modes of the vehicle based on the detected arrangement and input operations to the first operation part and the second operation part when the determiner determines the switching of the traveling modes is permitted, and maintains the current traveling mode when the determiner determines the switching of the traveling modes is not permitted.

18 Claims, 9 Drawing Sheets

(51) Int. Cl.
*B60K 23/08* (2006.01)
*B60K 17/348* (2006.01)
*B60W 50/08* (2012.01)
*B60K 35/00* (2006.01)

(52) U.S. Cl.
CPC ............ *B60K 35/00* (2013.01); *B60W 10/14* (2013.01); *B60W 50/082* (2013.01); *B60K 2023/0816* (2013.01); *B60K 2023/0841* (2013.01); *B60K 2023/0891* (2013.01); *B60K 2350/352* (2013.01)

(56) References Cited

U.S. PATENT DOCUMENTS

| | | | | |
|---|---|---|---|---|
| 2004/0195028 | A1* | 10/2004 | Izumi | B60K 23/04 180/249 |
| 2013/0226428 | A1 | 8/2013 | Nihei et al. | |
| 2014/0336001 | A1* | 11/2014 | Imafuku | B60K 23/08 477/35 |

* cited by examiner

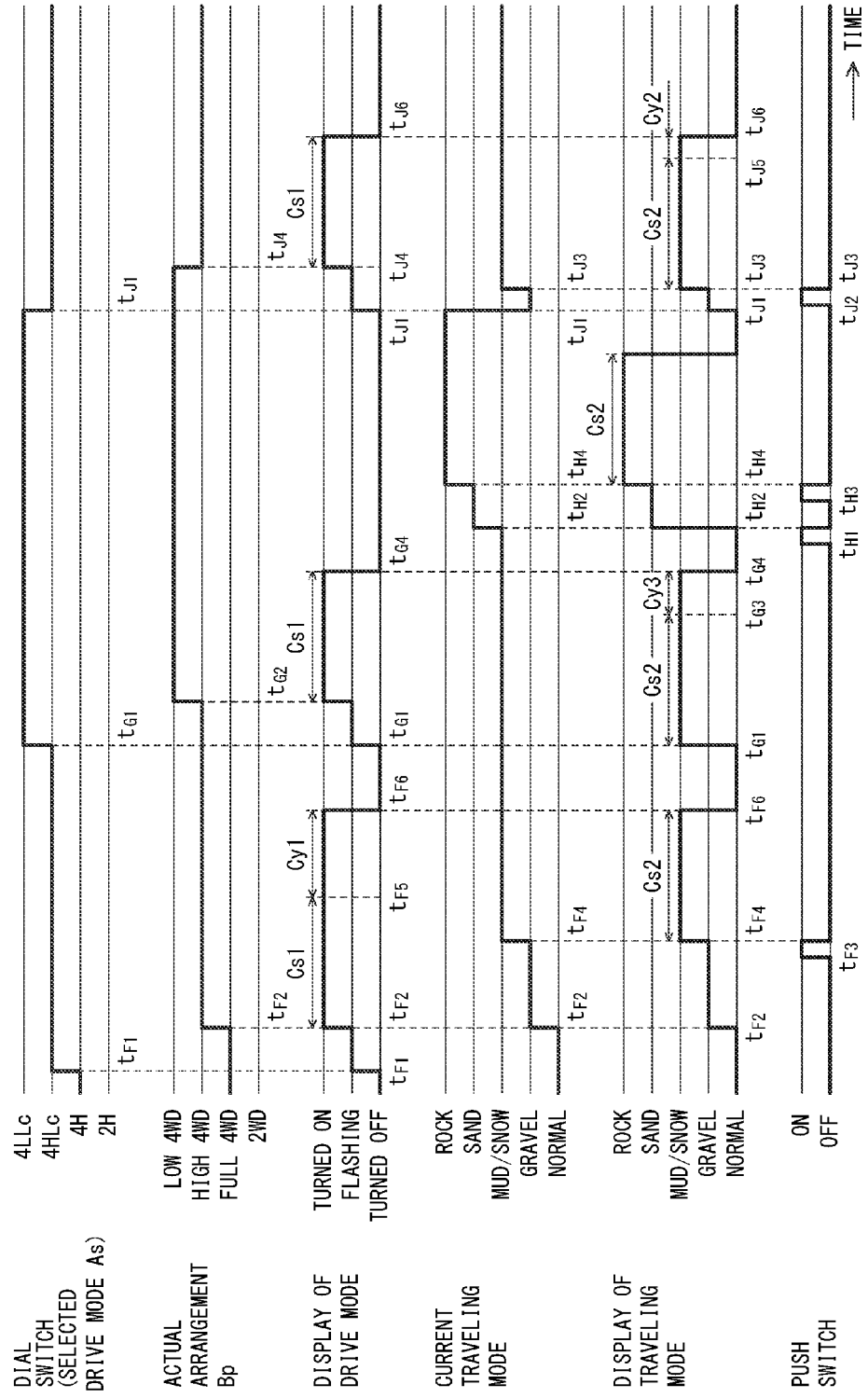

CONTROLLER OF FOUR-WHEEL DRIVE VEHICLE

CROSS-REFERENCE TO THE RELATED APPLICATION

This application incorporates by references the subject matters of Application No. 2015-031907 filed in Japan on Feb. 20, 2015 and Application No. 2015-031908 filed in Japan on Feb. 20, 2015 on which a priority claim is based under 35 U. S. C. § 119(a).

FIELD

The present invention relates to a controller of a four-wheel drive vehicle including a transfer device.

BACKGROUND

Four-wheel drive vehicles can be categorized into part-time four wheel drive vehicles that basically operate in a two-wheel drive state and can switch to a four-wheel drive state if necessary, and full-time four wheel drive vehicles that include center differentials disposed between the front wheels and the rear wheels and constantly operate in the four-wheel drive state (for example, refer to Japanese Unexamined Patent Application Publication No. 2000-247159). Four-wheel drive vehicles that include transfer devices and operate in both part-time and full-time types or in multiple different control modes (traveling modes) have been put to practical use.

For example, Japanese Unexamined Patent Application Publication No. 2010-149850 discloses a four-wheel drive vehicle that includes a mode selector switch switchable among six traveling modes. The four-wheel drive vehicle operates in a normal traveling mode at start-up of an off-road guidance ECU and then switches to one of the traveling modes selected with the mode selector switch. The driving arrangement (position) recommended for the selected traveling mode is displayed on a guidance screen for presentation of the operating method of the vehicle to a driver. Such presentation can promote the setting of the recommended driving arrangement of the driving system of the vehicle suitable for the selected traveling mode.

The technique described in Japanese Unexamined Patent Application Publication No. 2010-149850 provides guidance to a driver on a recommended driving arrangement (drive mode of the vehicle) suitable for the traveling mode preliminarily selected by the driver. For other four-wheel drive vehicles, a driver preliminarily selects the drive mode of the vehicle and then selects the traveling mode. The drive modes of a vehicle include a two-wheel drive (2WD) mode, a full-time four-wheel drive (full-time 4WD) mode, and a direct-connection four-wheel drive (direct-connection 4WD) mode. The traveling modes include a normal traveling mode and off-road traveling modes suitable for off-road driving.

The off-road traveling modes are selected when the driving force should be certainly transmitted to a rough road for driving, for example, in deep snow, sandy ground, or muddy ground. The off-road traveling modes can usually be set in the direct-connection 4WD mode. The selector for the traveling mode (off-road traveling mode), however, is installed on a position such as an instrument panel that is easy to be operated by the driver and readily accessible by a person in the passenger seat. Thus, in some cases, the selector may be improperly operated in a drive mode other than the direct-connection 4WD mode or by the person's prank in the passenger seat. Switching the traveling mode to a mode inappropriate for the drive mode due to improper operation of the selector may lower the traveling performance of the four-wheel drive vehicle.

The transfer device includes a mechanism including multiple gears and coupling sleeves. The arrangement of this mechanism is controlled to switch the drive mode. The transfer device actually enters a drive mode selected by a driver in a predetermined time after the selection. Thus, the drive mode selected by the driver does not correspond to the arrangement of the transfer device for a predetermined time.

Some transfer devices have an arrangement corresponding to the direct-connection 4WD mode (direct-connection 4WD arrangement) between the arrangement corresponding to the 2WD mode (2WD arrangement) and the arrangement corresponding to the full-time 4WD mode (full-time 4WD arrangement). On the other hand, a drive-mode selector operated by a driver is provided to switch the different modes in an increasing order of driving force, i.e., the 2WD mode, the full-time 4WD mode, and the direct-connection 4WD mode, selected in this order.

If the transfer device has the configuration described above, the transfer device shifts from the 2WD arrangement to the full-time 4WD arrangement via the direct-connection 4WD arrangement in response to the driver operating the drive-mode selector from the 2WD mode to the full-time 4WD mode. This further prolongs the time during which the drive mode selected by the driver does not correspond to the arrangement of the transfer device.

Thus, even if the driver properly operates the selector for the traveling mode (off-road traveling mode), the actual arrangement of the transfer device may not correspond to the selected drive mode, and a traveling mode unsuitable for the drive mode may be selected. This may cause a reduction in the traveling performance of the four-wheel drive vehicle. The control modes of various drive operation assist devices installed in the vehicle are switched in accordance with the traveling mode. Thus, setting of an appropriate traveling mode is important for the safety of the vehicle.

SUMMARY

Technical Problems

An object of the present invention, which has been conceived in light of the issues described above, is to provide a controller for a four-wheel drive vehicle that can provide superb traveling performance and safety. In addition to the object described above, any other object of the present invention is the achievement of advantages through the configuration of the embodiments of the present invention described below, which cannot be achieved by any traditional art.

Solution to Problems (1) A controller of a four-wheel drive vehicle disclosed herein is a controller of a four-wheel drive vehicle provided with a transfer device including a lock mechanism that locks a center differential and a switch mechanism that switches between a two-wheel drive state and a four-wheel drive state, the transfer device distributing an output from an engine to front and rear shafts, the controller further including: a first operation part operated by a passenger to switch drive modes of a vehicle; a second operation part operated by the passenger to switch off-road traveling modes indicating traveling modes for off-road driving of the vehicle; a transfer controller that controls an arrangement of the transfer device in response to the drive mode selected by the first operation part; and a detector that detects the arrangement of the transfer device.

The controller further includes a determiner that determines whether a switching of the traveling modes is permitted or not based on the drive mode selected by the first operation part and the arrangement detected by the detector; and a setter that sets one of the traveling modes based on the arrangement detected by the detector and input operations to the first operation part and the second operation part when the determiner determines the switching of the traveling modes is permitted, and maintains the current traveling mode when the determiner determines the switching of the traveling modes is not permitted.

(2) Preferably, the drive modes include a locked drive mode for a four-wheel drive state in which the center differential is locked by the lock mechanism. In this configuration, preferably, the determiner determines the switching of the traveling modes is not permitted in any of the drive modes selected by the first operation part when the arrangement detected by the detector is not a locked arrangement corresponding to the locked drive mode.

(3) Preferably, the determiner determines the switching of the traveling modes is permitted when the arrangement detected by the detector is the locked arrangement and the drive mode selected by the first operation part is the locked drive mode.

(4) Preferably, the determiner determines the switching of the traveling modes is not permitted when the arrangement detected by the detector is the locked arrangement and the drive mode selected by the first operation part is not the locked drive mode.

(5) Preferably, the transfer controller determines the drive mode is selected when the drive mode switched by the first operation part continues for a predetermined first determination time or longer, determines the arrangement is detected when the same arrangement detected by the detector continues for a second determination time or longer, the second determination time being longer than the first determination time, and transfers the results to the determiner.

(6) Preferably, the vehicle includes a drive operation assist device that adjusts a braking force and a driving force of wheels in accordance with operation of the vehicle to assist the drive operation. In this configuration, preferably, the controller includes a system controller that controls the drive operation assist device in accordance with the drive mode selected by the first operation part and the traveling mode set by the setter.

(7) Preferably, the vehicle includes a sub-transmission mechanism that is connected to the output of a transmission and has a high-gear arrangement (high-gear position) and a low-gear arrangement (low-gear position). In addition, preferably, the drive modes include a two-wheel drive mode for a two-wheel drive state, an unlocked drive mode for a four-wheel drive state in which the center differential is released, and a high-speed locked drive mode for a four-wheel drive state in which the center differential is locked by the lock mechanism and the sub-transmission mechanism is set in the high-gear arrangement. In these configurations, preferably, the transfer device has a high-speed locked arrangement corresponding to the high-speed locked drive mode, the high-speed locked arrangement being arranged between a two-wheel drive arrangement corresponding to the two-wheel drive mode and an unlocked arrangement corresponding to the unlocked drive mode, and the first operation part operated by the passenger to switch the two-wheel drive mode, the unlocked drive mode, and the high-speed locked drive mode in this order.

(8) Preferably, the drive modes include a low-speed locked drive mode for a four-wheel drive state in which the center differential is locked by the lock mechanism and the sub-transmission mechanism is set in the low-gear arrangement. In addition, preferably, the first operation part is a dial switch operated by the passenger to switch the two-wheel drive mode, the unlocked drive mode, the high-speed locked drive mode, and the low-speed locked drive mode in this order, and the second operation part is a push switch disposed near the first operation part.

(9) Preferably, the drive modes include a locked drive mode for a four-wheel drive state in which the center differential is locked by the lock mechanism, and the setter sets an initial mode of the off-road traveling modes upon shifting of the arrangement detected by the detector from an arrangement other than the locked arrangement to the locked arrangement, when the drive mode is switched from a mode other than the locked drive mode to the locked drive mode by the first operation part.

(10) Preferably, the vehicle includes a sub-transmission mechanism that is connected to the output of a transmission and has a high-gear arrangement and a low-gear arrangement. In addition, preferably, the locked drive mode includes a high-speed locked drive mode in which the sub-transmission mechanism is set in the high-gear arrangement and a low-speed locked drive mode in which the sub-transmission mechanism is set in the low-gear position, and the off-road traveling modes include modes for the high-speed locked drive mode and modes for the low-speed locked drive mode, at least part of the modes for the low-speed locked drive mode being different modes from at least part of the mode for the high-speed locked drive mode. In these configurations, preferably, the setter sets the traveling mode to the initial mode when one of the high-speed locked drive mode and the low-speed locked drive mode is selected, the traveling mode is set to the different mode, and the drive mode is switched to the other one by the first operation part.

(11) Preferably, the off-road traveling modes include at least one common mode for the high-speed locked drive mode and the low-speed locked drive mode, and the setter maintains the common mode when one of the high-speed locked drive mode and the low-speed locked drive mode is selected, the traveling mode is set to the common mode, and the drive mode is switched to the other one by the first operation part.

(12) Preferably, the second operation part is a push switch disposed near the first operation part, and the off-road traveling modes include multiple sub-modes set stepwise in response to off-road. In addition, preferably, the setter switches the traveling mode to a next level of the sub-mode to set the sub-mode when a duration of a push operation for the push switch is less than a predetermined time, and sets the traveling mode to the initial mode when the duration is equal to or longer than the predetermined time.

(13) Preferably, the vehicle includes a display disposed in the interior of the vehicle, and the controller includes a display controller that makes to the display to display the current traveling mode set by the setter when the locked drive mode is currently selected by the first operation part and the arrangement detected by the detector is a locked arrangement corresponding to the locked drive mode.

(14) Preferably, the display controller makes the display to display invalidity of the off-road traveling modes when the second operation part is operated unless the arrangement detected by the detector is the locked arrangement.

(15) Preferably, the setter sets invalidity of the off-road traveling modes when the drive mode switches the locked drive mode to a drive mode other than the locked drive mode by the first operation part.

Advantageous Effects

The controller of a four-wheel drive vehicle determines whether the switching of traveling modes is permitted or not on the basis of the drive mode selected by a first operation part and the arrangement detected by a detector. When switching is determined to be permitted, a new traveling mode is selected, whereas when switching is determined to be not permitted, the current traveling mode is maintained. Thus, an appropriate traveling mode (off-road traveling mode) for off-road driving can be set. As a result, the traveling performance (for example, run through performance for off-road driving and stability for on-road driving) of the four-wheel drive vehicle can be maintained while the safety of the vehicle is increased.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIG. 11 is an example time chart illustrating the operation of the controller illustrated in FIG. 2.

DESCRIPTION OF EMBODIMENTS

Embodiments will now be described with reference to the accompanying drawings. The embodiments described below are for mere illustration, and various modifications and technological applications that are not described in the embodiments should not be excluded from the scope of the invention. The configurations of the embodiments may be modified in various ways within the scope of the invention and may be selected and/or be combined appropriately.

[1. Configuration of Controller]
[1-1. Driving System]

Figure 1:
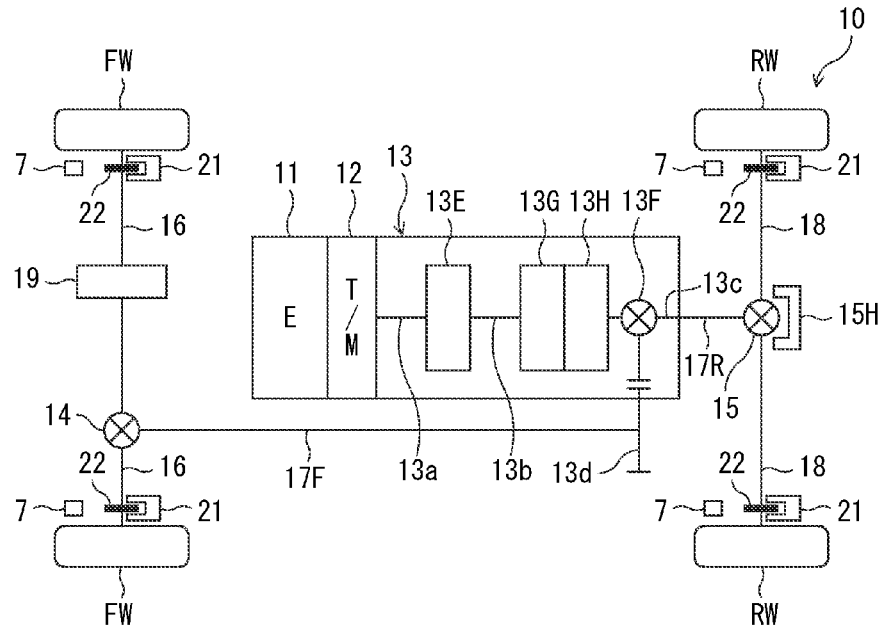
FIG. 1 illustrates the configuration of a vehicle including a controller according to an embodiment.

A controller according to this embodiment is installed in an automobile (vehicle) 10 illustrated in FIG. 1. The vehicle 10 is a four-wheel drive vehicle including an engine 11 as a driving source. The vehicle 10 includes the engine 11, a transmission 12, a transfer device 13, a front differential 14, and a rear differential 15, and so on, which collectively constitute a power train.

The engine 11 is an internal combustion engine (for example, a gasoline engine or diesel engine) that uses gasoline or diesel fuel. The transmission 12 is an automatic transmission (AT) connected to the output shaft of the engine 11. The gear ratio is set in accordance with a shifting operation by the driver. The transfer device 13, which includes an input shaft 13a connected to the output shaft of the transmission 12, is a power distributor that distributes the output (driving force, torque) of the engine 11 to the front and rear shafts 16 and 18. Details of the transfer device 13 will be described below.

The transfer device 13 includes an intermediate shaft 13b that is coaxial to the input shaft 13a, a rear output shaft 13c that receives the driving force from the input shaft 13a, and a front transfer sprocket 13d. The rear output shaft 13c is connected to the rear differential 15 via a rear propeller shaft 17R. Right and left rear shafts 18 extend from the rear differential 15 and are connected to respective rear wheels RW.

A front propeller shaft 17F extends from the front transfer sprocket 13d. An end of the front propeller shaft 17F is connected to the front differential 14. Right and left front shafts 16 extend from the front differential 14 and are connected to the respective front wheels FW. A free-wheel mechanism 19 is disposed on the right front shaft 16 for connection and separation of the right front wheel FW relative to the front differential 14.

The transfer device 13 includes a sub-transmission mechanism 13E disposed between the input shaft 13a and the intermediate shaft 13b, and a center differential 13F disposed between the intermediate shaft 13b and the rear output shaft 13c. The transfer device 13 further includes a switch mechanism 13G and a lock mechanism 13H disposed between the sub-transmission mechanism 13E and the center differential 13F.

The sub-transmission mechanism 13E serves as a high-low switch mechanism connected to the output side of the transmission 12 and, for example, includes multiple gears, a counter shaft, and a coupling sleeve. The sub-transmission mechanism 13E has a high-gear arrangement (high-gear position) and a low-gear arrangement (low-gear position) and switches between these arrangements in accordance with the engagement state of the components in the sub-transmission mechanism 13E. In the high-gear arrangement, the rotation of the input shaft 13a is directly transmitted to the intermediate shaft 13b, whereas in the low-gear arrangement, the rotation of the input shaft 13a is decelerated before transmission to the intermediate shaft 13b.

The center differential 13F absorbs the rotational difference between the front and rear shafts 16 and 18, and distributes and transmits the driving force. The center differential 13F may be in the form of a planetary gear mechanism. The switch mechanism 13G switches between a two-wheel drive (2WD) mode and a four-wheel drive (4WD) mode and, for example, includes multiple clutch gears connected to the center differential 13F and a coupling sleeve. The lock mechanism 13H locks the differential operation of the center differential 13F and, for example, includes multiple clutch gears connected to the center differential 13F and a coupling sleeve.

Upon selection (setting) of an arrangement (position) of the 2WD mode of the transfer device 13 by the switch mechanism 13G, the transmission 12 outputs only to the rear shafts 18 causing the vehicle 10 to enter the two-wheel (rear-wheel) drive state. Hereinafter, the drive mode of the vehicle 10 corresponding to this state is referred to as a 2H drive mode (two-wheel drive mode), and the arrangement (position) of the transfer device 13 in this state is referred to a 2WD arrangement (two-wheel drive arrangement). That is, the 2WD arrangement of the transfer device 13 corresponds to the 2H mode. The transfer device 13 is set to the 2WD arrangement (the switch mechanism 13G selects the 2WD arrangement) only when the lock mechanism 13H releases the center differential 13F.

Upon selection (setting) of an arrangement (position) of the 4WD mode of the transfer device 13 by the switch mechanism 13G without lock of the center differential 13F by the lock mechanism 13H, the input from the transmission 12 is distributed to the front shafts 16 and the rear shafts 18 in accordance with the gear ratio of the center differential 13F, and the vehicle 10 enters the four-wheel drive state in which the center differential 13F is released. Hereinafter, the drive mode of the vehicle 10 corresponding to this state is referred to as a 4H drive mode (unlock drive mode), and the arrangement (position) of the transfer device 13 in this state is referred to as the full-time 4WD arrangement. That is, the full-time 4WD arrangement of the transfer device 13 corresponds to the 4H drive mode.

The center differential 13F of the transfer device 13 is locked by the lock mechanism 13H and enters a direct-connection state. In this state, the driving force from the input shaft 13a is equally distributed to the rear output shaft 13c and the front transfer sprocket 13d without any differential operation by the center differential 13F. Hereinafter, the drive mode of the vehicle 10 corresponding to this state is referred to as the locked drive mode, and the arrangement of the transfer device 13 in this state is referred to as the locked arrangement. That is, the locked arrangement of the transfer device 13 corresponds to the locked drive mode. The center differential 13F enters the direct-connection state only when the transfer device 13 is in the arrangement of the 4WD mode (only when the switch mechanism 13G selects the arrangement of the 4WD mode).

The locked drive mode includes two modes depending on the arrangement of the sub-transmission mechanism 13E: a high-speed locked drive mode (4HLc drive mode) and a low-speed locked drive mode (4LLc drive mode). The transfer device 13 enters the 4HLc drive mode when the center differential 13F enters the direct-connection state and the sub-transmission mechanism 13E is set to the high-gear arrangement (hereinafter referred to as the high-direct-connection 4WD arrangement). In other words, the high-direct-connection 4WD arrangement of the transfer device 13 corresponds to the 4HLc drive mode.

The transfer device 13 enters the 4LLc drive mode when the center differential 13F is in the direct-connection state and the sub-transmission mechanism 13E is set to the low-gear arrangement (hereinafter referred to as the low-direct-connection 4WD arrangement). In other words, the low-direct-connection 4WD arrangement of the transfer device 13 corresponds to the 4LLc drive mode. That is, the locked arrangement described above includes two locked arrangements: the high-direct-connection 4WD arrangement and the low-direct-connection 4WD arrangement.

The transfer device 13 transfers the largest driving force to the front and rear shafts 16 and 18 in the low-direct-connection 4WD arrangement, and transfers the second largest driving force in the high-direct-connection 4WD arrangement. Thus, the 4HLc and 4LLc drive modes are drive modes for off-road driving, whereas the 2H and 4H drive modes are drive modes for on-road for driving. In other words, selecting the 4HLc or 4LLc drive mode (i.e., the locked drive mode) for off-road driving achieves high drivability. In contrast, selecting the 2H or 4H drive mode for on-road driving maintains high fuel efficiency and low noise and achieves stable driving.

The transfer device 13 includes an actuator (not shown) that operates in accordance with instructions from a transfer ECU 1 described below and controls the sub-transmission mechanism 13E, the switch mechanism 13G, and the lock mechanism 13H so as to set different arrangements. The transfer device 13 according to this embodiment assumes the 2WD arrangement, the full-time 4WD arrangement, and the high-direct-connection 4WD arrangement provided therebetween. In other words, the transfer device 13 always passes through the high-direct-connection 4WD arrangement when shifting from the 2WD arrangement to the full-time 4WD arrangement, or vice versa.

The front differential 14 absorbs the rotational difference between the right and left front wheels FW, and distributes and transmits the driving force from the front propeller shaft 17F between the front wheels FW. The rear differential 15 absorbs the rotational difference between the right and left rear wheels RW, and distributes and transmits the driving force from the rear propeller shaft 17R between the rear wheels RW. The rear differential 15 includes a differential lock mechanism 15H that locks the differential operation of the rear differential 15. The differential lock mechanism 15H includes an actuator (not shown) that operates in accordance with instructions from the transfer ECU 1 to lock the rear differential 15 such that the differential lock mechanism 15H enters a direct-connection state.

[1-2. Brake System]

The vehicle 10 includes a brake system that applies a braking force to the vehicle 10 in response to the operation of a braking pedal (not shown) by the driver. The brake system according to this embodiment is a typical hydraulic disk brake system including a brake booster (not shown), a master cylinder (not shown), and brake pads 21.

The force applied to the brake pedal is multiplied at the brake booster and enters the master cylinder. The force transmits through the brake fluid filled in the interior of the master cylinder in the form of pressure, thereby generates a braking pressure. The braking pressure is applied to the braking pads 21 in the wheels FW and RW. The braking pads 21 clamp brake disks 22 to apply a friction force (braking force) to the wheels FW and RW.

[1-3. Assist System and Display]

Figure 2:
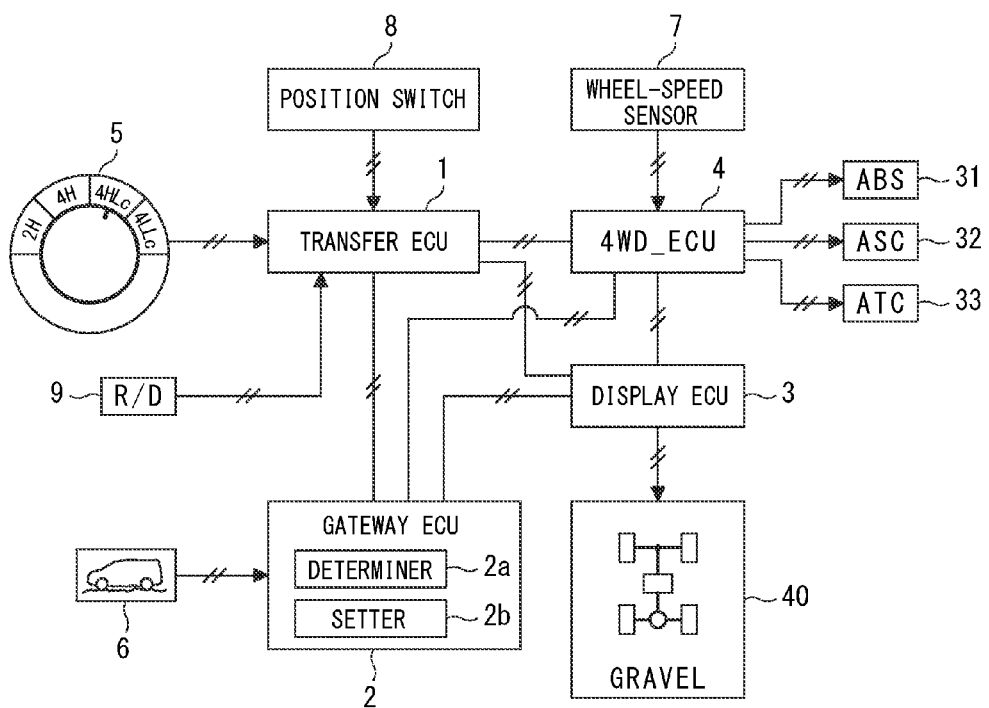
FIG. 2 is a block diagram illustrating a controller according to an embodiment.

With reference to FIG. 2, the vehicle 10 includes a system for assisting the operation by the driver (drive operation assist device) consisting of an antilock brake system (ABS) 31, an active stability control system (ASC) 32, and an active traction control system (ATC) 33. The drive operation assist device operates in accordance with instructions from a 4WD ECU 4.

The ABS 31 controls the braking force through adjustment of the braking pressure in response to a sudden braking operation by the driver, for example. The ABS 31 prevents lock of the wheels FW and RW during a sudden braking to avoid slipping. The ASC 32 comprehensively controls the engine 11 and the brake system when the vehicle 10 skids due to a sudden operation of the steering wheel by the driver, for example. The ASC 32 prevents unstable movement of the vehicle 10 and slipping of the wheels FW and RW. The ATC 33 comprehensively controls the engine 11 and the brake system when slipping of the drive wheels is detected during sudden starting on a slippery road or ascending or descending a steep slope, for example. The ATC 33 assists smooth starting and acceleration.

Meters (not shown) and a display 40 that indicate the condition of the vehicle 10 are installed, for example, on an instrument panel (not shown) in the interior of the vehicle 10. The display 40 is a liquid display disposed adjacent to the meters, including a speedometer and an engine tachometer, and displays the current drive mode, the current traveling mode, the current shift position, the average speed, the fuel consumption, the exterior temperature, and the remaining fuel quantity.

The display 40 according to this embodiment is a multi-information display that can switch among different information items (windows). The display 40 displays different windows including, for example, an initial window, a mode display window, a distant-to-empty/drive assist window, an average speed/instantaneous fuel consumption window, and a notification window. The windows of the display 40 are switched by a display ECU 3, which is described below, or manually switched by the driver. The switch (not shown) used for switching the windows is disposed near the meters, for example.

Figure 3A:
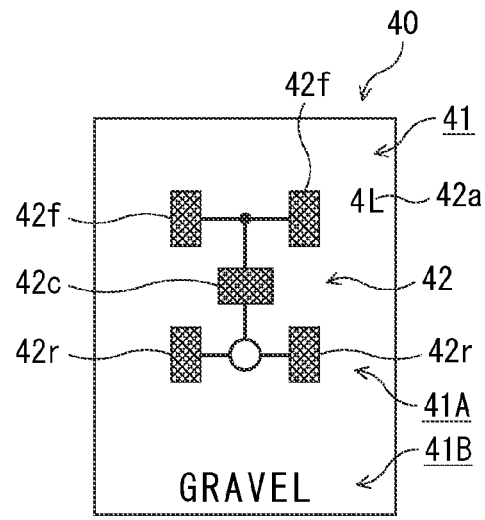
FIG. 3A is a schematic view illustrating a display of the vehicle illustrated in FIG. 1 indicating a 4LLc drive mode.
Figure 3B:
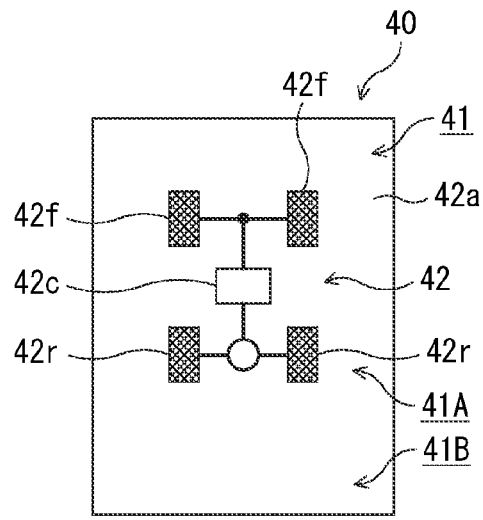
FIG. 3B is a schematic view illustrating the display of the vehicle illustrated in FIG. 1 in a 4H drive mode.

With reference to FIGS. 3A and 3B, a window displayed on the display 40 contains a drive-mode display area (hereinafter referred to as a first area 41A) and a traveling-mode display area (hereinafter referred to as a second area 41B). This window is referred to as a mode display window 41. The mode display window 41 is one of the multiple windows displayed on the display 40. Other windows are not displayed on the display 40 while the mode display window 41 is being displayed, and vice versa.

The first area 41A in the mode display window 41 displays an indicator light 42 representing the shape of the four-wheel drive vehicle. The indicator light 42 includes two front wheel indicators 42*f* corresponding to the right and left front wheels FW, two rear wheel indicators 42*r* corresponding to the right and left rear wheels RW, and a differential indicator 42*c* corresponding to the center differential 13F. The indicator light 42 further includes a 4L indicator 42*a* to the right of the right front wheel indicator 42*f*. The front wheel indicators 42*f*, the rear wheel indicators 42*r*, the differential indicator 42*c*, and the 4L indicator 42*a* can switch among three illumination states: ON, OFF, and flashing states. The illumination state of the indicators is controlled by the display ECU 3.

FIGS. 3A and 3B illustrate the illumination states of the front wheel indicators 42*f*, the rear wheel indicators 42*r*, and the differential indicator 42*c* in the 4LLc drive mode and the 4H drive mode, respectively. The OFF state is indicated by a blank and the ON or flashing state is indicated by cross-hatching. With reference to FIG. 3A, in the 4LLc drive mode, the front wheel indicators 42*f*, the rear wheel indicators 42*r*, and the differential indicator 42*c* are all turned on and the characters "4L" are displayed at the 4L indicator 42*a*. In the 4HLc drive mode, the illumination states of the indicators are the same as those in the 4LLc drive mode, except for the 4L indicator 42*a*, which is turned off.

With reference to FIG. 3B, in the 4H drive mode, the front wheel indicators 42*f* and the rear wheel indicators 42*r* are turned on, and the differential indicator 42*c* and the 4L indicator 42*a* are turned off. In the 2H drive mode, only the rear wheel indicators 42*r* are turned on, and all the other indicators are turned off.

The second area 41B is disposed below the first area 41A in the mode display window 41. The ON/OFF state of the second area 41B is controlled by the display ECU 3. The second area 41B is lighted to display characters indicating the current traveling mode or the invalidity of the off-road traveling mode described below. Nothing is displayed when the second area 41B is turned off.

[1-4. Detection System and Control System]

With reference to FIG. 2, the vehicle 10 includes, for example, a dial switch 5 (first operation part) and a push switch 6 (second operation part) disposed on a center console (not shown), and an R/D switch 9 disposed on the lower portion of the instrumental panel.

The dial switch 5 functions as an operation part for switching (selecting) the drive mode of the vehicle 10 and is operated by a passenger (primarily the driver). The dial switch 5 can be operated by a passenger to select the 2H drive mode, the 4H drive mode, the 4HLc drive mode, and the 4LLc drive mode in this order from the left. The drive mode selected with the dial switch 5 is transmitted to the transfer ECU 1.

The R/D switch 9 functions as an operation part for switching (selecting) the locked state of the rear differential 15 by the differential lock mechanism 15H, and is pushed by a passenger (primarily the driver). The R/D switch 9 can be operated only when the drive mode is the locked drive mode (4HLc or 4LLc drive mode). The operation of the R/D switch 9 is sent to the transfer ECU 1.

The push switch 6 is disposed near the dial switch 5 and functions as an operation part for switching (selecting) the traveling mode (off-road traveling mode) for off-road driving of the vehicle 10. The push switch 6 is operated by a passenger (primarily the driver). The push switch 6 can select different traveling modes through a short key press and a long key press. The operation of the push switch 6 is sent to a gateway ECU 2 described below.

The drive mode indicates the condition of the transfer device 13 (corresponds to the arrangement of the transfer device 13), whereas the traveling mode means a control mode preliminarily set, and is selected in accordance with the driving condition of the vehicle 10. The traveling mode includes a normal traveling mode selected for on-road driving, and off-road traveling modes selected for off-road driving. The various components installed in the vehicle 10 are controlled on the basis of the selected traveling mode.

With reference to FIGS. 1 and 2, the vehicle 10 includes wheel-speed sensors 7 for the wheels FW and RW that detect the rotational angles of the shafts 16 and 18. The variation in the rotational angle per unit time for each of the shafts 16 and 18 is proportional to the number of rotations of the corresponding wheel FW or RW. The number of rotations of the wheels FW and RW is proportional to the wheel speed (vehicle speed) without slipping. The information detected by the wheel-speed sensors 7 is sent to a 4WD ECU 4, which is described below.

The vehicle 10 includes an arrangement switch 8 (detector) that detects the arrangement of the transfer device 13. The information detected by the arrangement switch 8 is sent to the transfer ECU 1. The vehicle 10 includes detectors other than the sensors described above; such detectors include an accelerator opening sensor that detects the depression of the accelerator pedal, a brake switch that detects the depression of the brake pedal, and a steering sensor that detects the operation angle of the steering wheel.

With reference to FIG. 2, the vehicle 10 includes a controller that includes multiple control units, such as the transfer ECU 1, the gateway ECU 2, the display ECU 3, and the 4WD ECU 4, all connected via a communication line. These electronic control units are composed of, for example, known microprocessors, LSI devices with integrated ROMs and RAMS, and embedded electronic devices. In addition to the controller including the ECUs 1 to 4, various electronic control units, such as an engine ECU or a transmission ECU, are connected to establish communication with each other.

[2. Control Configuration]

Figure 10:
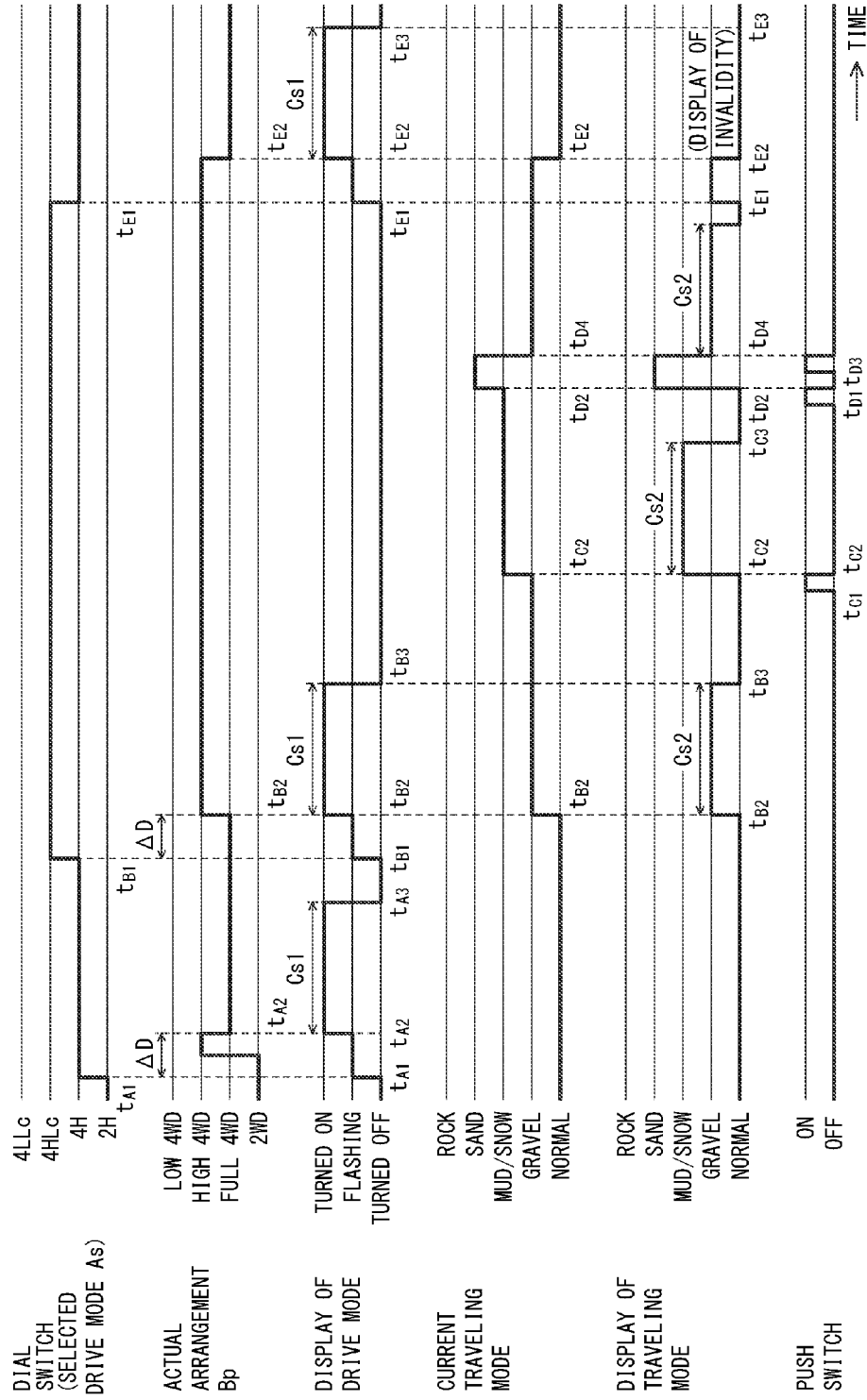
FIG. 10 is an example time chart illustrating the operation of the controller illustrated in FIG. 2.

The configurations of the transfer ECU 1, the gateway ECU 2, the display ECU 3, and the 4WD ECU 4 in the controller of the four-wheel drive vehicle according to this embodiment will now be described with reference to the time charts in FIGS. 10 and 11. FIG. 10 is a time chart illustrating the transition of the drive mode through selection by the dial switch 5 in the following sequence: 2H drive mode, the 4H drive mode, the 4HLc drive mode, and the 4H drive mode. FIG. 11 is a time chart illustrating the transition of the drive mode in the following sequence: the 4H drive mode, the 4HLc drive mode, the 4LLc drive mode, and the 4HLc drive mode.

[2-1. Transfer ECU]

The transfer ECU 1 (transfer controller) controls the transfer device 13 and the rear differential 15. The transfer ECU 1 determines whether the drive mode has been shifted on the basis of the information sent from the dial switch 5. If the transfer ECU 1 determines the shifting has been made, the transfer ECU 1 newly stores the drive mode upon the switching of the dial switch 5 as "selected drive mode As" (i.e., the "selected drive mode As" is updated).

The selected drive mode As is a parameter indicating the current drive mode determined by or stored in the transfer ECU 1 on the basis of information sent from the dial switch 5. If the transfer ECU 1 determines that the drive mode has not been shifted, the current drive mode As selected by the dial switch 5 is maintained without update. The transfer ECU 1 controls the transfer device 13 so as to shift the arrangement of the transfer device 13 to that corresponding to the selected drive mode As.

The shifting of the drive mode can be determined, for example, by confirming the continuation of a particular drive mode for a predetermined first determination time D1 or longer from the moment of operation of the dial switch 5. In other words, the transfer ECU 1 determines a drive mode if the drive mode continues for the first determination time D1 or longer after selection by the dial switch 5. The first determination time D1 is preliminarily determined in consideration of chattering of the dial switch 5 and is set to a significantly short time, for example, several tens of milliseconds. This eliminates the influence of the chattering of the dial switch 5 on the detected value.

If the selected drive mode As is updated, the transfer ECU 1 sends an instruction (signal) corresponding to the updated selected drive mode As to the actuator of the transfer device 13. The sub-transmission mechanism 13E, the switch mechanism 13G, and the lock mechanism 13H of the transfer device 13 are controlled in accordance with this instruction to arrange the transfer device 13 such that the arrangement corresponds to the drive mode (selected drive mode As) selected by the dial switch 5.

A time difference of the first determination time D1 or longer occurs between the switching of the drive mode by the dial switch 5 and the transmission of the instruction to the actuator in response to the determination of the drive mode by the transfer ECU 1. A time difference also occurs between the reception of the instruction by the transfer device 13 and the shifting to the actual arrangement of the transfer device 13 corresponding to the selected drive mode As through control of the mechanisms 13E, 13G, and 13H. That is, a time difference $\Delta D$, such as that illustrated in FIG. 10, occurs between the selection of the drive mode by a passenger and the shifting to the actual arrangement of the transfer device 13 corresponding to the selected drive mode. Thus, the arrangement of the transfer device 13 does not correspond to the drive mode selected by the dial switch 5 for a predetermined time (for example, the period between times $t_{41}$ to $t_{42}$ in FIG. 10). The time difference $\Delta D$ may be variable.

The transfer ECU 1 determines whether the arrangement of the transfer device 13 has been shifted on the basis of the information sent from the arrangement switch 8. If the transfer ECU 1 determines the shifting has been made, the transfer ECU 1 newly stores the arrangement detected by the arrangement switch 8 as "an actual arrangement Bp" (the actual arrangement Bp is updated). The actual arrangement Bp is a parameter indicating the current arrangement of the transfer device 13 determined by or stored in the transfer ECU 1 based on the information sent from the arrangement switch 8. If the transfer ECU 1 determines that the arrangement of the transfer device 13 has not been shifted, the actual arrangement Bp is not updated.

The shifting of the arrangement of the transfer device 13 can be determined, for example, by confirming the continuation of the arrangement for a predetermined second determination time D2 or longer from the moment the shifting of the arrangement is detected by the arrangement switch 8. In other words, the transfer ECU 1 determines the detection of the actual arrangement Bp by the arrangement switch 8 if the corresponding arrangement continues to be detected by the arrangement switch 8 for the second determination time D2 or longer. The second determination time D2 is preliminarily determined in consideration of chattering of the arrangement switch 8 and the vibration generated during shifting of the arrangement and is set to a time longer than the first determination time D1, for example, several tens to several hundreds of milliseconds. This eliminates the influence of the chattering of the arrangement switch 8 and the vibration generated during shifting of the arrangement on the detected value.

The transfer ECU 1 sends an instruction (signal) for switching the state of the rear differential 15 to the actuator of the differential lock mechanism 15H in response to an input operation to the R/D switch 9. This causes the rear differential 15 to be locked or unlocked.

The transfer ECU 1 sends the selected drive mode As and the actual arrangement Bp (i.e., the results based on the information from the dial switch 5 and the arrangement switch 8) to the gateway ECU 2, the display ECU 3, and the 4WD ECU 4. The transfer ECU 1 also sends the state of the rear differential 15 to the display ECU 3.

[2-2. Gateway ECU]

The gateway ECU 2 sets the traveling mode and includes a determiner 2a and a setter 2b as functional components. These components may be provided in the form of electronic circuits (hardware) or software programs. Alternatively, part of the functions may be provided as hardware while the other functions provided in the form of software.

The determiner 2a determines whether a switching of the traveling modes is permitted or not on the basis of the drive mode selected by the dial switch 5 and the arrangement detected by the arrangement switch 8. The traveling mode can be switched by the dial switch 5 and the push switch 6. The off-road traveling mode should be selected in the locked drive mode, which is suitable for the off-road traveling mode. Thus, the determiner 2a determines whether it is appropriate to switch the traveling mode in accordance with the input operation of the dial switch 5 or push switch 6 by a passenger.

The determiner 2a uses the selected drive mode As and the actual arrangement Bp sent from the transfer ECU 1 as the drive mode selected by the dial switch 5 and the arrangement detected by the arrangement switch 8, respectively, in this determination. That is, the determiner 2a uses two parameters, i.e., the drive mode selected by the passenger (selected drive mode As) and the actual arrangement of the transfer device 13 (actual arrangement Bp) in the above determination.

In particular, if the actual arrangement Bp is the locked arrangement, the determiner 2a determines the switching of the traveling mode is permitted when the selected drive mode As is the locked drive mode, whereas determines the switching of the traveling mode is not permitted when the selected drive mode As is not the locked drive mode. That is, if the actual arrangement Bp of the transfer device 13 is a high-direct-connection 4WD arrangement or a low-direct-connection 4WD arrangement and the selected drive mode As is the 4HLc drive mode or the 4LLc drive mode, which respectively correspond to the arrangements, the switching of the traveling mode is permitted.

In contrast, if the actual arrangement Bp is not the locked arrangement, the determiner 2a determines the switching of the traveling mode is not permitted (prohibited) regardless of the selected drive mode As. That is, if the actual arrangement Bp of the transfer device 13 is not the high-direct-connection 4WD arrangement or the low-direct-connection 4WD arrangement, the switching of the traveling mode is not permitted even if the selected drive mode As is the 4HLc or 4LLc drive mode, and the input operation to the push switch 6 is invalidated. The determination process is shown in Table 1.

The determiner 2a sends the results to the setter 2b.

TABLE 1

| Actual Arrangement Bp | Selected Drive Mode As | Switching of Traveling Mode |
| --- | --- | --- |
| Locked Arrangement | Locked Drive Mode | Permitted |
| Locked Arrangement | Drive Mode Other than Locked Drive Mode | Not permitted |
| Arrangement Other than Locked Arrangement | All Drive Modes | Not permitted |

If the determiner 2a determines the switching of the traveling mode is permitted, the setter 2b sets the traveling mode (off-road traveling mode) of the vehicle 10 on the basis of the arrangement detected by the arrangement switch 8 and the input operations to the dial switch 5 and the push switch 6. The setter 2b uses the selected drive mode As sent from the transfer ECU 1 as the drive mode selected by the dial switch 5 (the input operation to the dial switch 5), and uses the actual arrangement Bp sent from the transfer ECU 1 as the arrangement detected by the arrangement switch 8 in this setting. When the determiner 2a determines the switching of the traveling mode is not permitted, the setter 2b maintains the current traveling mode.

Figure 4:
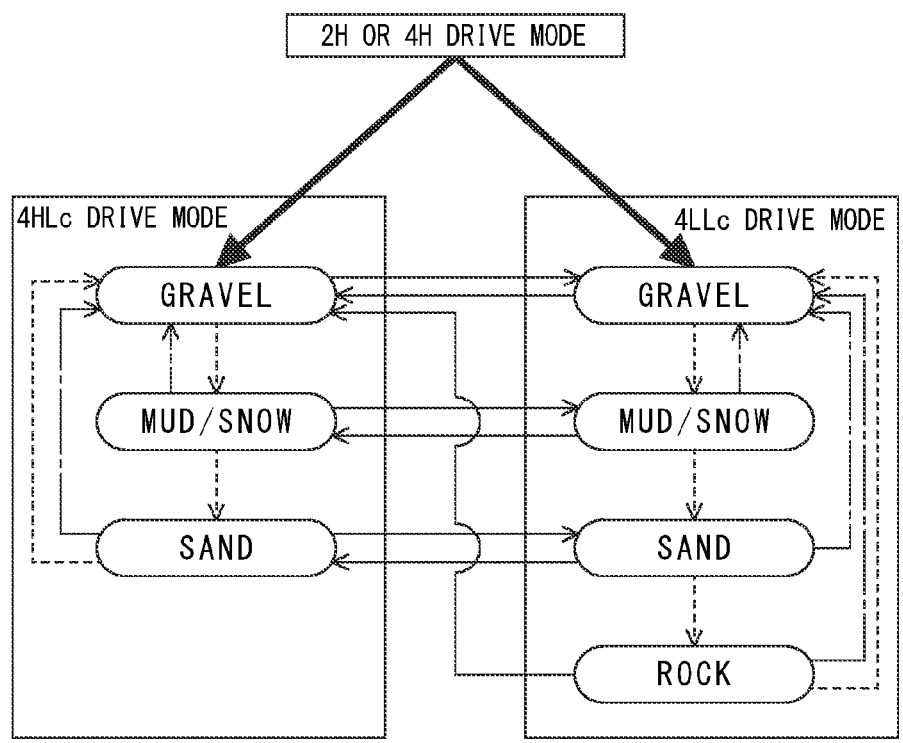
FIG. 4 is a state transition diagram for explaining a switching of traveling modes.

The traveling mode includes the normal traveling mode and the off-road traveling modes, as described above. The off-road traveling modes include multiple sub-modes set stepwise in response to off-road. Some of the multiple sub-modes are common to both the 4HLc and 4LLc drive modes, and the other sub-modes differ for the 4HLc and 4LLc drive modes. With reference to FIG. 4, the off-road traveling modes according to this embodiment include a GRAVEL traveling mode, a MUD/SNOW traveling mode, and a SAND traveling mode, which are common modes for the 4HLc and 4LLc drive modes, and a ROCK traveling mode which is a different mode for the 4HLc and 4LLc drive modes. The setter 2b according to this embodiment also sets the normal traveling mode.

FIG. 4 is a state transition diagram of traveling modes. The rectangle frames represent drive modes (selected drive modes As), and the oval frames represent the traveling modes. The thick solid arrows represent the transition of the traveling modes in accordance with the shifting of the actual arrangement Bp, whereas the thin solid arrows represent the transition of the traveling modes in accordance with the switching of the drive modes. The dotted arrows and the dash-dot arrows respectively represent the transition of the traveling modes in response to a short key press and a long key press of the push switch 6. The setter 2b determines whether the pushing operation of the push switch 6 is a short key press or a long key press on the basis of the duration of the pushing operation. For example, the setter 2b determines the pushing operation of the push switch 6 to be a short key press if the duration is less than a predetermined time tp, and determines the pushing operation to be a long key press if the duration is equal to or longer than the predetermined time tp.

The GRAVEL traveling mode is an initial mode of the off-road traveling modes suitable for driving on a gravel road. The MUD/SNOW traveling mode is suitable for driving in mud road or deep snow. The SAND traveling mode is suitable for driving in sand ground. These three traveling modes can be selected in either the 4HLc or 4LLc drive mode. In contrast, the ROCK traveling mode is suitable for driving on an uneven road, such as on rock, and can be selected only in the 4LLc drive mode.

The selection (switching) of the traveling mode in response to the operation of the dial switch 5 will now be described. If the drive mode is switched from a mode other than the locked drive mode (2H or 4H drive mode) to the locked drive mode (4HLc or 4LLc drive mode) by the dial switch 5, the setter 2b sets the GRAVEL traveling mode, which is the initial mode of the traveling modes, as indicated by the thick solid arrows in FIG. 4, upon shifting of the actual arrangement Bp from an arrangement other than the locked arrangement (2WD or full-time 4WD arrangement) to the locked arrangement (high-direct-connection 4WD or low-direct-connection 4WD arrangement). For example, as illustrated in FIG. 10, if the selected drive mode As is switched from the 4H drive mode to the 4HLc drive mode by the dial switch 5 at time $t_{B1}$, the actual arrangement Bp shifts to the high-direct-connection 4WD arrangement at time $t_{B2}$ with a time delay of $\Delta D$. The setter 2b sets the GRAVEL traveling mode at time $t_{B2}$.

As indicated by the thin solid arrows in FIG. 4, if the drive mode is one of the 4HLc and 4LLc drive modes and the traveling mode is the common mode (i.e. one of the GRAVEL, MUD/SNOW, and SAND traveling modes), the setter 2b maintains the current common mode upon the drive mode is switched to the other one of the 4HLc and 4LLc drive modes by the dial switch 5. For example, as illustrated in FIG. 11, if the selected drive mode As is the 4HLc drive mode and the traveling mode is the MUD/SNOW traveling mode (after time $t_{F4}$), the current MUD/SNOW traveling mode is maintained even after switching the selected drive mode As to the 4LLc drive mode by the dial switch 5 at time $t_{G1}$.

In contrast, if the drive mode is one of the 4HLc and 4LLc drive modes and the traveling mode is the different mode (the ROCK traveling mode), the setter 2b sets the GRAVEL traveling mode, which is the initial mode of the traveling modes, upon switching of the drive mode to the other one of the 4HLc and 4LLc drive modes by the dial switch 5. In this embodiment, as illustrated in FIG. 11, if the drive mode is the 4LLc drive mode and the traveling mode is the ROCK traveling mode (after time $t_{H4}$), the GRAVEL traveling mode is set upon switching to the 4HLc drive mode in response to operation of the dial switch 5 at time $t_{J1}$.

The GRAVEL traveling mode may be set at any time. For example, the GRAVEL traveling mode may be set at time $t_{J1}$ upon switching of the selected drive mode As in response to operation of the dial switch 5, or may be set at time $t_{J4}$ upon shifting of the actual arrangement Bp. The setter 2b according to this embodiment sets the GRAVEL traveling mode at time $t_{J1}$ upon switching of the selected drive mode As.

The setter 2b sets the normal traveling mode and sets invalidity of the off-road traveling mode upon switching from the locked drive mode (4HLc or 4LLc drive mode) to a drive mode other than the locked drive mode (2H or 4H drive mode) by the dial switch 5. For example, with reference to FIG. 10, the normal traveling mode is set and the off-road traveling mode is invalidated upon switching the selected drive mode As from the 4HLc drive mode to the 4H drive mode by the dial switch 5 at time $t_{E1}$. The off-road traveling mode may be invalidated at any timing. For example, the off-road traveling mode may be invalidated at time $t_{E1}$ upon switching the selected drive mode As in response to operation of the dial switch 5, or may be invalidated at time $t_{E2}$ upon shifting of the actual arrangement Bp. The setter 2b according to this embodiment invalidates the off-road drive mode at time $t_{E2}$ upon shifting of the actual arrangement Bp.

The setting (switching) of the traveling mode in response to operation of the push switch 6 will now be described. As indicated by the dotted arrows in FIG. 4, when the pushing operation of the push switch 6 is a short key press, the setter 2b switches the traveling mode to a subsequent graded level while maintaining the drive mode. As indicated by the dash-dot arrows in FIG. 4, when the pushing operation of the push switch 6 is a long key press, the setter 2b sets the GRAVEL traveling mode, which is the initial mode of the traveling modes while maintaining the drive mode.

In particular, if the drive mode is switched from the 2H or 4H drive mode to the 4HLc drive mode, the setter 2b first sets the GRAVEL traveling mode, which is the initial mode of the traveling modes (for example at time $t_{B2}$ in FIG. 10). In response to every short key press of the push switch 6, the traveling mode is switched through the MUD/SNOW traveling mode, the SAND traveling mode, and the GRAVEL traveling mode (for example, at times $t_{C1}$, $t_{C2}$, and $t_{D1}$ to $t_{D4}$ in FIG. 10) in this order. The traveling mode is always switched to the GRAVEL traveling mode in response to a long key press of the push switch 6 even if any traveling mode is set. If the push switch 6 is operated through a long key press in the GRAVEL traveling mode, the GRAVEL traveling mode is maintained.

Similarly, if the drive mode is switched from the 2H or 4H drive mode to the 4LLc drive mode, the setter 2b first sets the GRAVEL traveling mode, which is the initial mode of the traveling modes. In response to every short key press of the push switch 6, the traveling mode is switched through the MUD/SNOW traveling mode, the SAND traveling mode, the ROCK traveling mode, and the GRAVEL traveling mode (for example, at times $t_{H1}$ to $t_{H4}$, $t_{J2}$, and $t_{J3}$ in FIG. 11) in this order. The traveling mode is always switched to the GRAVEL traveling mode in response to a long key press of the push switch 6 even if any traveling mode is set. If the push switch 6 is operated through a long key press in the GRAVEL traveling mode, the GRAVEL traveling mode is maintained.

The setter 2b according to this embodiment determines the unlocked state of the rear differential 15 and the normal state of the brake system upon switching of the traveling mode as described above. If the rear differential 15 is in the unlocked state and the brake system is in the normal state, the setter 2b switches the traveling mode. In contrast, if the rear differential 15 is in the locked state or if the brake system is not in the normal state, the setter 2b does not switch the traveling mode but always sets the GRAVEL traveling mode. The case of the brake system is not in the normal state is that the brake system is experiencing some problems, such as a high estimated temperature. Such information can be detected, estimated, and determined, for example, at a brake ECU (not shown).

The setter 2b sends information on the set traveling mode to the display ECU 3 and the 4WD ECU 4.

[2-3. Display ECU]

The display ECU 3 (display controller) instructs the display 40 to display the drive mode on the basis of the input operation to the dial switch 5 and the arrangement detected by the arrangement switch 8, and also to display the traveling mode set by the setter 2b. The display ECU 3 uses the selected drive mode As sent from the transfer ECU 1 as the drive mode selected by the dial switch 5 (the input operation to the dial switch 5), and uses the actual arrangement Bp sent from the transfer ECU 1 as the arrangement detected by the arrangement switch 8 in this display.

If the drive mode is switched by the dial switch 5, the display ECU 3 controls the first area 41A to display the updated drive mode. Similarly, if the traveling mode set by the setter 2b is switched, the display ECU 3 controls the second area 41B to display the updated traveling mode. The display ECU 3 according to this embodiment displays the traveling mode in the mode display window 41 only if the off-road traveling mode is set. That is, the drive mode and the traveling mode are both displayed in the mode display window 41 only in the locked drive mode.

If the dial switch 5 is operated, the display ECU 3 starts the display of the drive mode upon matching of the arrangement corresponding to the updated drive mode and the actual arrangement Bp and continues the display for a predetermined first display time Cs1 or longer. For example, as illustrated in FIG. 10, if the selected drive mode As is switched at time $t_{A1}$ or $t_{B1}$, the display ECU 3 starts the display of the drive mode from time $t_{A2}$ or $t_{B2}$ upon matching of the arrangement corresponding to the updated drive mode and the actual arrangement Bp and continues the display for the first display time Cs1 (until time $t_{A3}$ or $t_{B3}$) or longer.

In other words, the display of the drive mode starts at the moment the arrangement corresponding to the selected drive mode As matches the actual arrangement Bp after switching of the drive mode in response to operation of the dial switch 5. Hereinafter, the term "display" refers to "lighting (illumination) of indicators." That is, the display ECU 3 turns on the front wheel indicators 42f, the rear wheel indicators 42r, the differential indicator 42c, and the 4L indicator 42a of the indicator light 42 corresponding to the updated drive mode upon matching of the arrangement corresponding to the selected drive mode As and the actual arrangement Bp.

The display ECU 3 according to this embodiment flashes the indicators for the updated drive mode from the moment of update of the drive mode by the dial switch 5 (for example, at time $t_{A1}$ in FIG. 10) to the moment the actual arrangement Bp matches the arrangement corresponding to the updated drive mode (time $t_{J2}$ in FIG. 10). That is, the display ECU 3 flashes the indicator light 42 in such a manner that corresponds to the updated selected drive mode As from the moment the selected drive mode As is updated, and then fully turns on the indicator light 42 without flashing upon matching of the actual arrangement Bp and the arrangement corresponding to the selected drive mode As. This announces the shifting of the arrangement of the transfer device 13 to the passengers.

The display ECU 3 starts the display of the traveling mode upon switching of the traveling mode set by the setter 2b and continues to display the traveling mode for a predetermined second display time Cs2 or longer. For example, as illustrated in FIG. 10, if the traveling mode is switched at time $t_{B2}$ or $t_{C2}$, the display of the traveling mode is started at time $t_{B2}$ or $t_{C2}$ and is continued for the second display time Cs2 (until time $t_{B3}$ or $t_{C3}$) or longer.

In other words, the display of the traveling mode starts at the moment the updated traveling mode is set by the setter 2b. That is, the display of the drive mode and the display of the traveling mode may not coincide and start at different times. The first and second display times Cs1 and Cs2 are preliminarily set to durations that allow ready confirmation of the switching of the modes by a passenger without too much waiting (for example, 3 to 5 seconds) and may be the same or different values. In this embodiment, the first and second display times Cs1 and Cs2 are set to same values. Hereinafter, the first and second display times Cs1 and Cs2 are collectively referred to as display time Cs, unless they should be differentiated.

If the updated drive mode is the locked drive mode, the display ECU 3 displays both the drive mode and the traveling mode on the mode display window 41 and simultaneously turns off both indicators after the display times Cs1 and Cs2. That is, the display ECU 3 adjusts the display time of the drive mode and the traveling mode such that the two modes are turned off at the same time even if they are turned on at different times.

For example, with reference to FIG. 11, if the traveling mode is switched by the setter 2b at time $t_{F4}$ during display of the drive mode continuing from time $t_{F2}$, the display ECU 3 extends the display time of the drive mode until the end time $t_{F6}$ of the display of the traveling mode (adds an extension time Cy1 to the first display time Cs1) and simultaneously turns off both indicators at time $t_{F6}$. If the traveling mode is switched by the setter 2b at time $t_{J3}$ during the flashing display of the drive mode from the time $t_{J1}$, the display ECU 3 extends the display time of the traveling mode until the end time $t_{J6}$ of the display of the drive mode (adds an extension time Cy2 to the second display time Cs2) and simultaneously turns off both indicators at time $t_{J6}$.

The display ECU 3 starts the display of the traveling mode upon switching of the drive mode from one of the 4HLc and 4LLc drive modes to the other one by the dial switch 5. That is, if the dial switch 5 switches the 4HLc drive mode to the 4LLc drive mode, or vice versa, the display ECU 3 starts the display of the traveling mode upon update of the selected drive mode As because the off-road traveling mode is already set.

For example, with reference to FIG. 11, if the selected drive mode As is switched from the 4HLc drive mode to the 4LLc drive mode at time $t_{G1}$, the display of the traveling mode is started at time $t_{G1}$. In such a case, the display ECU 3 extends the display time of the traveling mode until the end time $t_{G4}$ of the display of the drive mode (adds an extension time Cy3 to the second display time Cs2) to simultaneously turn off both indicators at time $t_{G4}$.

If the drive mode is switched by the dial switch 5 from the locked drive mode to a drive mode other than the locked drive mode, the display ECU 3 according to this embodiment starts the display of the traveling mode upon switching of the drive mode (for example, time $t_{E1}$ in FIG. 10). The display ECU 3 displays the drive mode and switches from the display of the traveling mode to an off-road invalidity display upon matching of the actual arrangement Bp and the arrangement corresponding to the selected drive mode As (at time $t_{E2}$ in FIG. 10). The term "off-road invalidity display" refers to displaying the word "invalidated" in the second area 41B.

If the drive mode is switched to the 2H or 4H drive mode, the setter 2b sets the normal traveling mode and invalidates the off-road traveling mode. Thus, if the selected drive mode As is switched to the 2H or 4H drive mode, the display ECU 3 temporarily displays the latest traveling mode maintained until the actual arrangement Bp matches the arrangement corresponding to the selected drive mode As. Upon matching, the display ECU 3 displays the invalidity of the traveling mode to announce the invalidity of the off-road traveling mode to the passengers. The invalidity display is turned off at the end of the display of the drive mode (at time $t_{E3}$ in FIG. 10).

If the push switch 6 is operated at the actual arrangement Bp other than the locked arrangement (i.e. the 2WD or full-time 4WD arrangement), the display ECU 3 displays the off-road invalidity display in the second area 41B. In other words, the display ECU 3 displays the off-road invalidity display in the second area 41B when the push switch 6 is operated unless the arrangement detected by the arrangement switch 8 is the locked arrangement.

[2-4. 4WD ECU]

The 4WD ECU 4 (system controller) controls the drive operation assist device in accordance with the drive mode selected by the dial switch 5 and the traveling mode set by the setter 2b. The 4WD ECU 4 uses the selected drive mode As sent from the transfer ECU 1 as the drive mode selected by the dial switch 5 in this control.

The 4WD ECU 4 according to this embodiment controls the ABS 31, the ASC 32, and the ATC 33 as shown in Table 2. Specifically, if the drive mode is the 2H or 4H drive mode, the 4WD ECU 4 carries out normal control (hereinafter also referred to as control A), and if the drive mode is the 4HLc or 4LLc drive mode, the 4WD ECU 4 varies the contents of the control depending on the traveling mode. The ATC 33 controlled by the 4WD ECU 4 controls the engine 11 and the brake system in different manners; thus, in Table 2, the ATC 33 controlling the engine 11 is indicated with the suffix (E) and the ATC 33 controlling the brake system is indicated with the suffix (B).

TABLE 2

| CONTROL | ABS | ASC | ATC (E) | ATC (B) |
|---|---|---|---|---|
| A | 2 H OR 4 H | 2 H OR 4 H | 2 H OR 4 H | 2 H OR 4 H |
| B | GRAVEL MUD/SNOW SAND ROCK | GRAVEL | GRAVEL | GRAVEL |
| C | — | MUD/SNOW | MUD/SNOW | MUD/SNOW |
| D | — | SAND | SAND | SAND |
| E | — | — | — | ROCK |

For example, as shown in Table 2, the 4WD ECU 4 carries out normal control (control A) on the ABS 31 if the drive mode is the 2H or 4H drive mode or if the traveling mode is the GRAVEL or MUD/SNOW traveling mode, and carries out control B if the traveling mode is the SAND or ROCK traveling mode. Control B carried out on the ABS 31 is designed for driving on sand ground or rock ground. A high target slippage (target slip quantity of wheels) reduces the braking distance on sand ground.

Controls B, C, and D carried out on the ASC 32 are designed for driving on gravel, mud/deep snow, and sand ground, respectively. Compared to Control A (normal control), the control quantities of the brake system and the engine 11 are reduced in the order of Controls B, C, and D so as to enhance run through performance (drivability). Controls B, C, D, and E carried out on the ATC 33 are designed for driving on gravel, mud/deep snow, sand ground, and rock ground, respectively. Compared to Control A (normal control), the control quantities of the brake system and the engine 11 are reduced in the order of Controls B, C, and D so as to enhance run through performance (drivability). For Control E, the target slippage is set lower than that of Control A and the control quantity of the brake system is increased to enhance stability of driving at significantly low speed, smooth detachment of wheels from the ground, and run through performance (drivability). The dashes in Table 2 indicate an OFF state of the control.

[3. Flow Chart]

Figure 5:
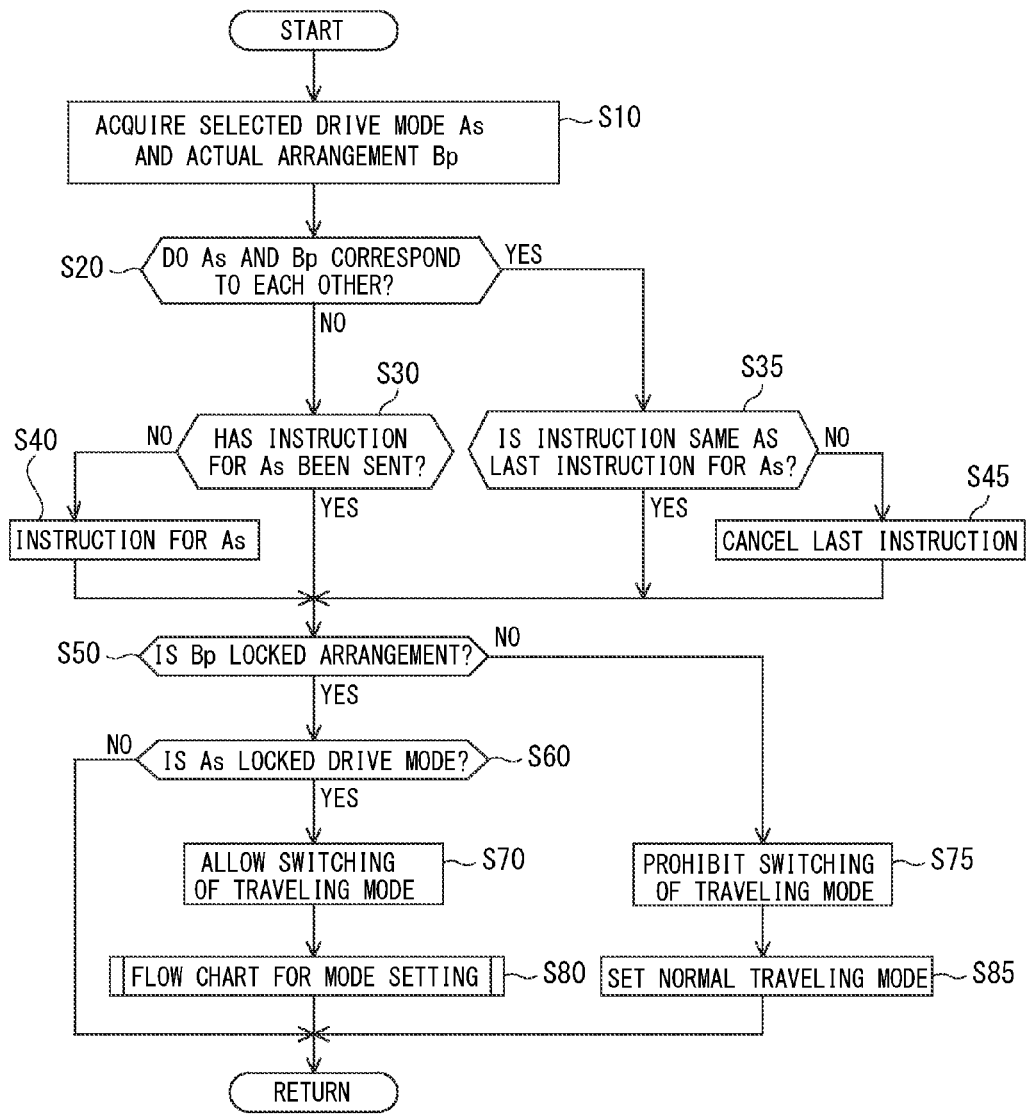
FIG. 5 is an example flow chart illustrating the process carried out by a gateway ECU.
Figure 6:
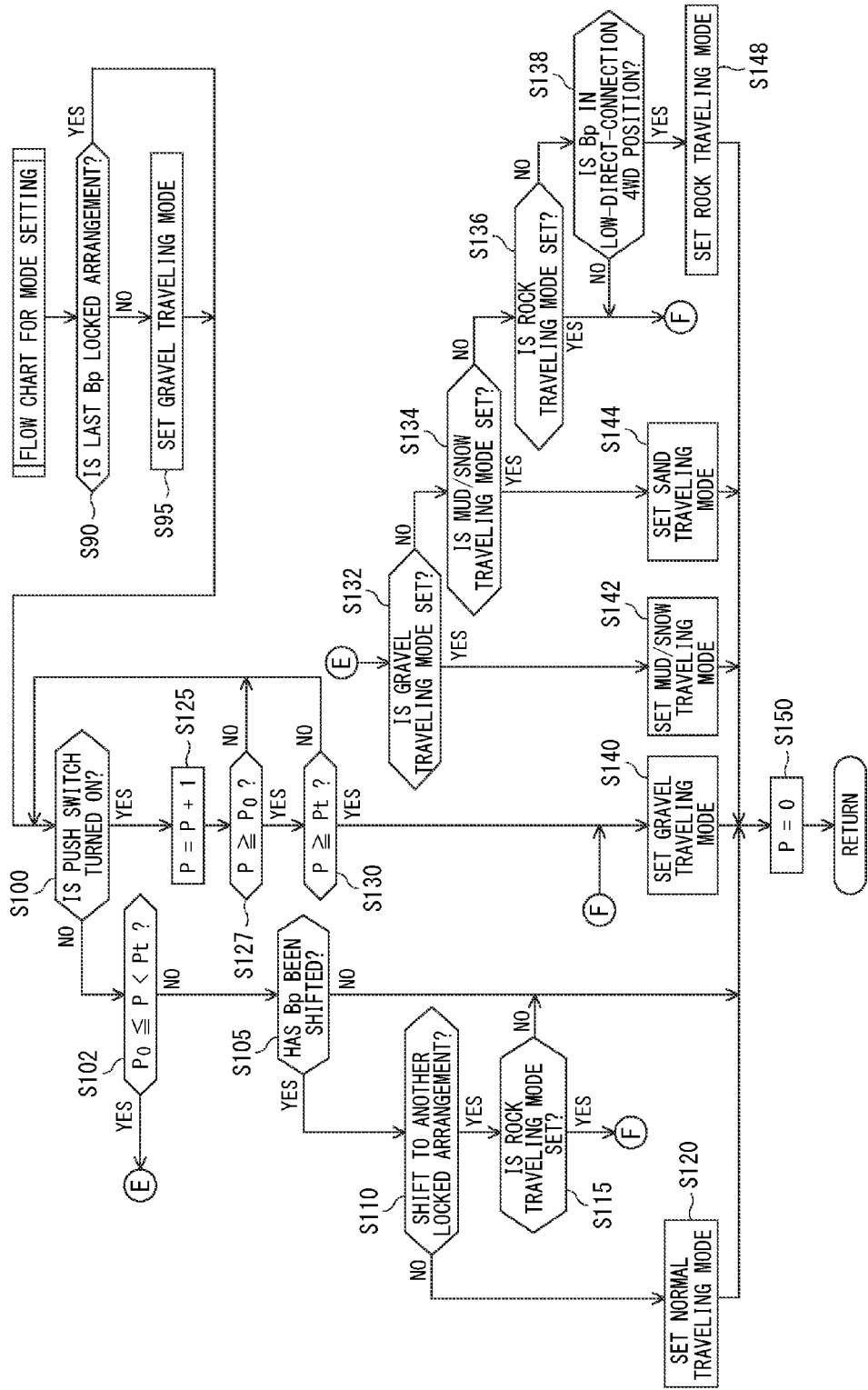
FIG. 6 is a flow chart illustrating a sub-process of FIG. 5.
Figure 7:
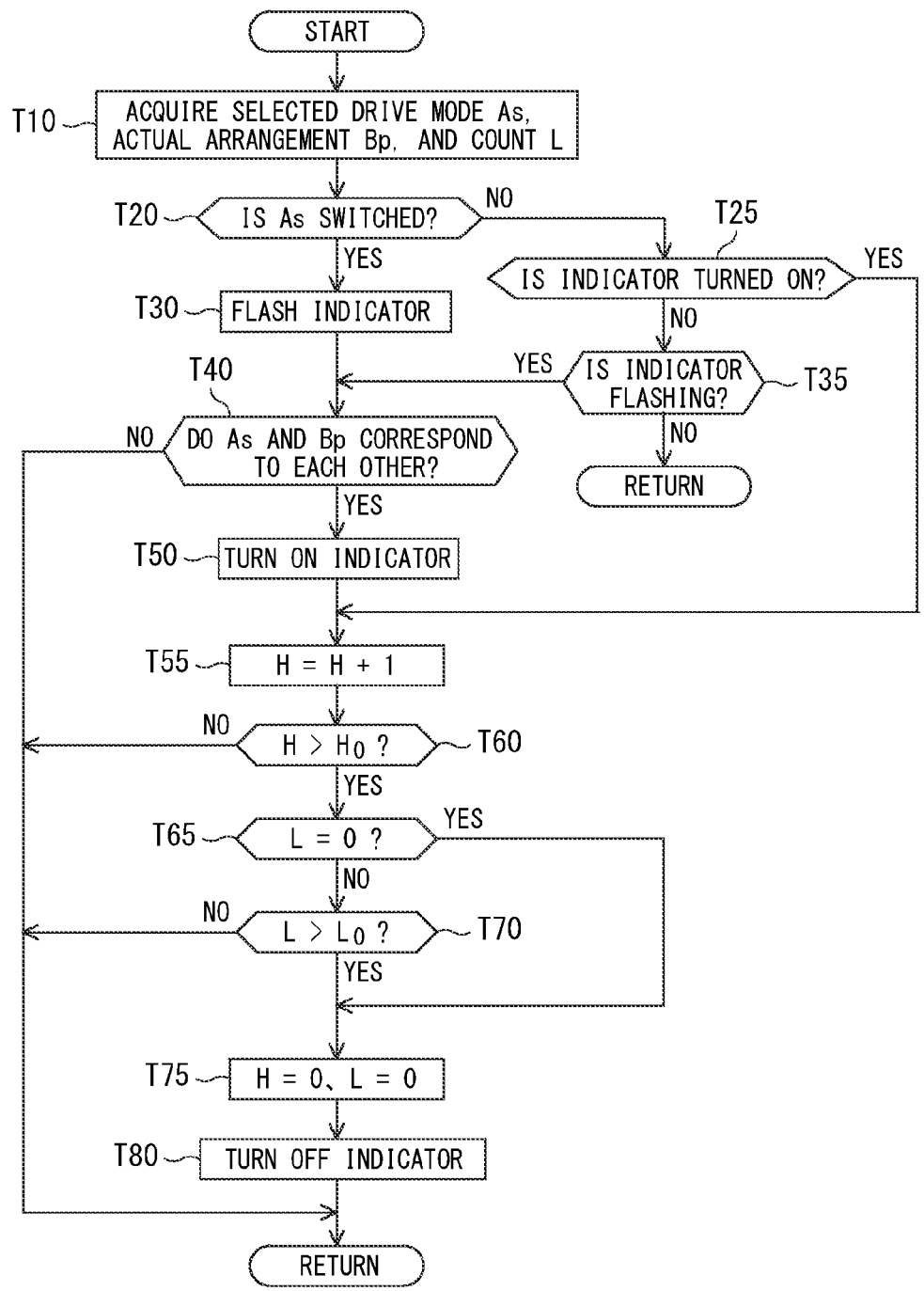
FIG. 7 is an example flow chart illustrating the process carried out by a display ECU.
Figure 8:
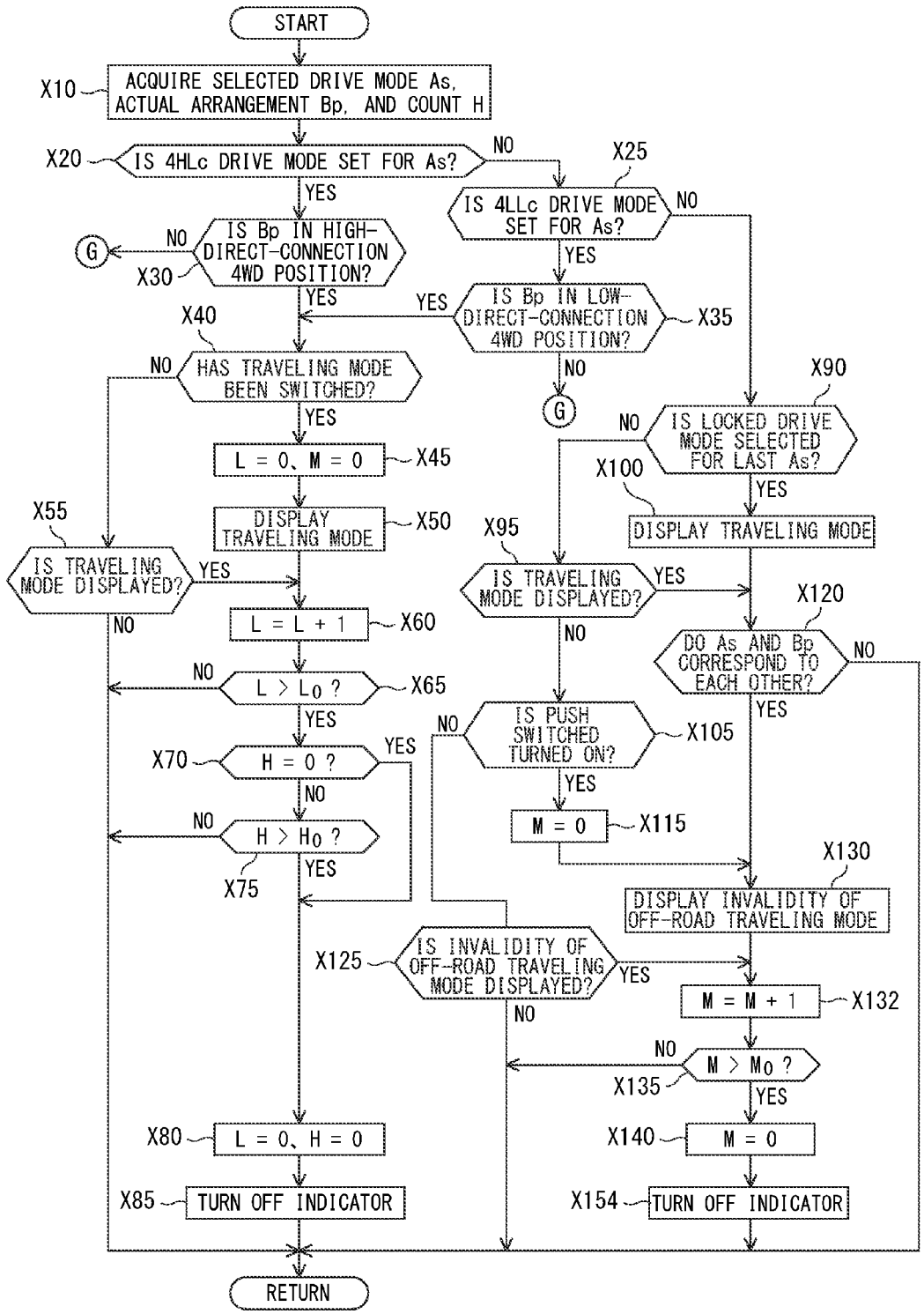
FIG. 8 is an example flow chart illustrating the process carried out by a display ECU.
Figure 9:
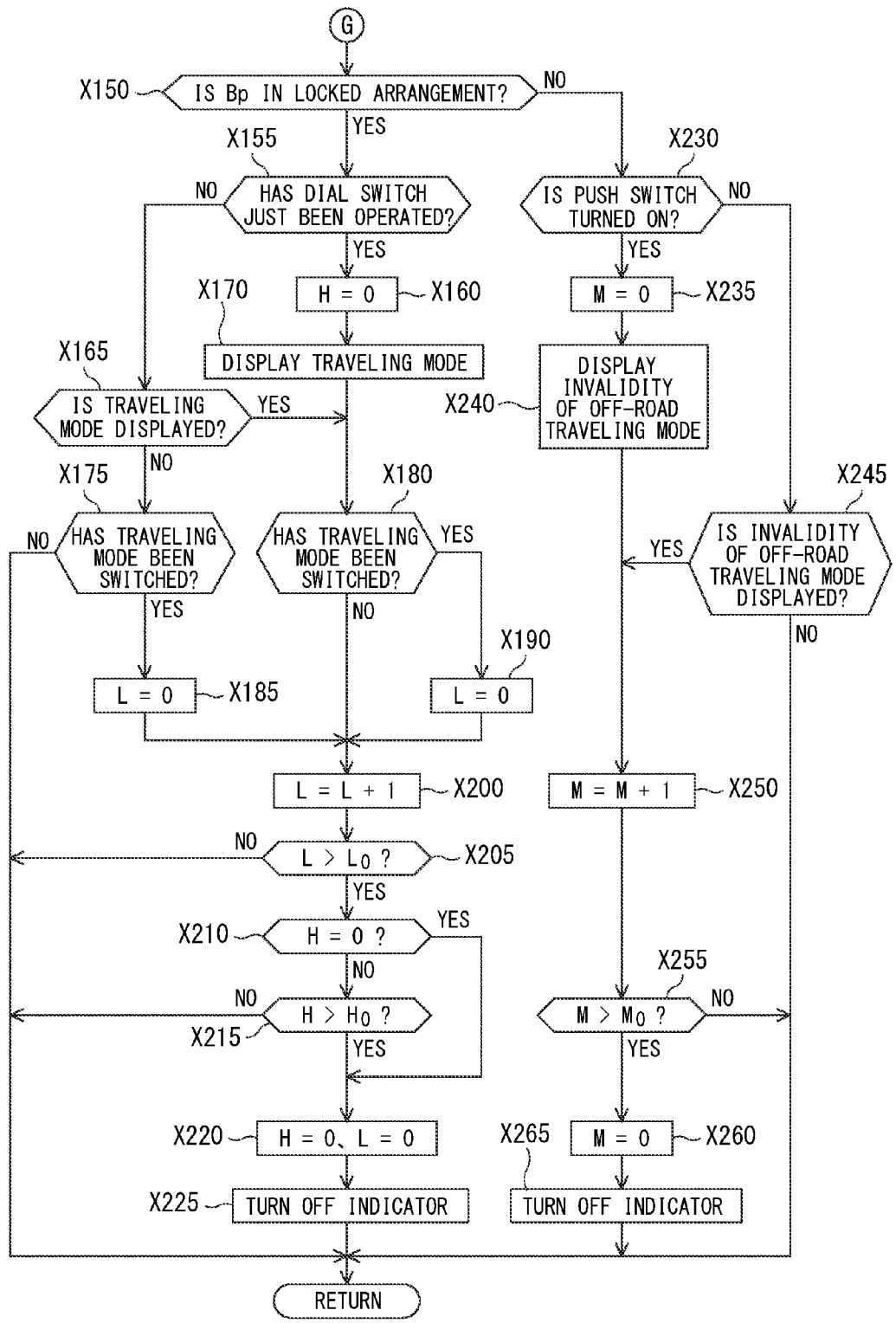
FIG. 9 is a flow chart illustrating a sub-process of FIG. 8.

FIG. 5 is an example flow chart illustrating the process carried out by the gateway ECU 2. FIG. 6 is a flow chart illustrating a sub-process of FIG. 5. FIG. 7 is an example flow chart illustrating a process for displaying the drive mode carried out by the display ECU 3. FIGS. 8 and 9 are flow charts illustrating a process for displaying the traveling mode carried out by the display ECU 3.

The processes illustrated in these flow charts start upon turning on the ignition key switch and are repeated through predetermined calculation cycles in the gateway ECU 2 and the display ECU 3. The transfer ECU 1 acquires information from the dial switch 5 and the arrangement switch 8 through a predetermined calculation cycle, stores the selected drive mode As and the actual arrangement Bp, and sends the information to the gateway ECU 2, the display ECU 3, and the 4WD ECU 4.

[3-1. Flow Chart for Determination and Setting of Traveling Mode]

The determination and setting of the traveling mode carried out in the gateway ECU 2 will now be described. With reference to FIG. 5, the gateway ECU 2 acquires the selected drive mode As and the actual arrangement Bp from the transfer ECU 1 (Step S10) and determines whether the selected drive mode As and the actual arrangement Bp correspond to each other (Step S20). That is, the gateway ECU 2 determines whether the actual arrangement Bp matches the arrangement corresponding to the selected drive mode As (hereinafter this relationship is represented as "As=Bp"). If the arrangements do not match (do not correspond to each other), the process goes to Step S30, whereas if the arrangements match (correspond to each other), the process goes to Step S35.

In Step S30, the gateway ECU 2 determines whether an instruction corresponding to the selected drive mode As is sent from the transfer ECU 1 to the transfer device 13. If the instruction is not sent, the transfer ECU 1 sends the instruction (Step S40), and the process goes to Step S50. If the instruction is sent, the process directly goes to Step S50. In Step S50, the gateway ECU 2 determines whether the actual arrangement Bp is the locked arrangement. If the result is YES, the process goes to Step S60, whereas if the result is NO, the process goes to Step S75.

In Step S60, the gateway ECU 2 determines whether the selected drive mode As is the locked drive mode. If the result is YES, the process goes to Step S70. In this case, the selected drive mode As is the locked drive mode, and the actual arrangement Bp is the locked arrangement. Thus, the switching of the traveling mode is permitted in Step S70. In Step S80, the flow chart in FIG. 6, which illustrates the setting of the traveling mode, is carried out.

In Step S75, the switching of the traveling mode is determined to be not permitted (prohibited), and then in Step S85, the normal traveling mode is set. The process then returns to the start. That is, if the actual arrangement Bp is not the locked arrangement, the switching of the traveling mode is not permitted regardless of the selected drive mode As, and the normal traveling mode is set.

A time difference ΔD occurs between the switching of the selected drive mode As and the shifting of the actual arrangement Bp to an arrangement corresponding to the selected drive mode As. Thus, if the dial switch 5 is operated to switch the selected drive mode As from the locked drive mode to a drive mode other than the locked drive mode in the locked actual arrangement Bp, the process follows the NO route from Step S60 and returns to the start. In this case, the actual arrangement Bp and the selected drive mode As do not correspond to each other. Thus, the transfer device 13 is controlled through Steps S30 and S40 and shifts to an arrangement corresponding to the selected drive mode As. After the time difference ΔD, the actual arrangement Bp shifts to an arrangement other than the locked arrangement. Thus, the process eventually goes to Step S75.

If the selected drive mode As is switched from the locked drive mode to a drive mode other than the locked drive mode due to an instantaneous operation (improper operation) of the dial switch 5 in the locked actual arrangement Bp, the process follows the NO route from Step S60. Also in this case, the actual arrangement Bp and the selected drive mode As do not correspond to each other, and an instruction corresponding to the selected drive mode As is sent to the transfer device 13 through Steps S30 and 40. If the selected drive mode As is switched back to the locked drive mode before the end of the time difference ΔD, the selected drive mode As corresponds to the actual arrangement Bp (As=Bp), and the process proceeds from Step S20 to Step S35.

In Step S35, it is determined whether the selected drive mode As previously instructed to the transfer device 13 is the same as the current selected drive mode As, which is acquired in Step S10 through the current calculation cycle. In this case, the previous selected drive mode As is a drive mode other than the locked drive mode, and the current selected drive mode As is the locked drive mode. The process goes to Step S45 because the current and previous selected drive modes differ. In Step S45, the previous instruction sent to the transfer ECU 1 is invalidated.

This invalidity maintains the previous conditions if the selected drive mode As is instantaneously switched to a drive mode other than the locked drive mode in the locked actual arrangement Bp or if the selected drive mode As is immediately switched back to the locked drive mode. Switching of the traveling mode is determined to be not permitted (prohibited) when the actual arrangement Bp is an arrangement other than the locked arrangement (2WD or full-time 4WD arrangement). Thus, the switching can be controlled appropriately in accordance with the actual conditions of the transfer device 13.

The flow chart for mode setting in Step S80 will now be described with reference to FIG. 6. With reference to FIG.

6, in Step S90, it is determined whether the actual arrangement Bp acquired in Step S10 through the previous calculation cycle is the locked arrangement. That is, it is determined whether the actual arrangement Bp is switched from an arrangement other than the locked arrangement to the locked arrangement through the current calculation cycle. If the result is NO, the process goes to Step S95, whereas if the result is YES, the process goes to Step S100.

In Step S95, the actual arrangement Bp is switched from an arrangement other than the locked arrangement to the locked arrangement through the current calculation cycle. Thus, the GRAVEL traveling mode, which is the initial mode of the traveling modes, is set, and the process then goes to Step S100. In Step S100, an input operation (push operation) to the push switch 6 is determined. If a push operation is not determined, it is determined whether a count P is larger than or equal to a lower limit $P_0$ (Step S102).

The count P is comparable to a timer for determining the push operation as a short key press or a long key press. If the count P is larger than or equal to the lower limit $P_0$ and below a predetermined value Pt ($P_0 \leq P < Pt$), the push operation is determined to be a short key press. If the count P is larger than or equal to the predetermined value Pt ($P \geq Pt$), the push operation is determined to be a long key press. The lower limit $P_0$ is determined in consideration of chattering of the push switch 6. The predetermined value Pt corresponds to the predetermined time tp and is preliminarily determined on the basis of the predetermined time tp and the calculation cycle. The predetermined value Pt is larger than the lower limit $P_0$. The count P is counted up in Step S125 for the duration of the push operation.

If $P < P_0$ in Step S102, it is determined whether the actual arrangement Bp is shifted (Step S105). That is, it is determined whether the actual arrangement Bp is shifted in response to the switching of the selected drive mode As by the dial switch 5. If the actual arrangement Bp is not shifted, the current traveling mode is maintained. The process then goes to Step S150. If the actual arrangement Bp is shifted, it is determined whether the actual arrangement Bp is shifted to another locked arrangement (Step S110). That is, it is determined whether the actual arrangement Bp is shifted from one of the high-direct-connection 4WD and low-direct-connection 4WD arrangements to the other one.

In Step S110, if the result is NO (i.e., if the actual arrangement Bp is shifted to an arrangement other than the locked arrangement), the normal traveling mode is set (Step S120), and the process goes to Step S150. If the actual arrangement Bp is shifted to another locked arrangement, it is determined whether the current traveling mode is the ROCK traveling mode, which is the traveling mode not common to the two locked drive modes (Step S115). If the traveling mode is the ROCK traveling mode, the process goes to Step S140. If the traveling mode is not the ROCK traveling mode, the current traveling mode is maintained, and the process goes to Step S150.

If a push operation is carried out in Step S100, the process goes to Step S125, and the count P is counted up by one (i.e., one is added to the current count P). Subsequently, it is determined whether $P \geq P_0$ (Step S127). If $P < P_0$, the process returns to Step S100. If the push operation continues, the count P is counted up again in Step S125, and the process goes to Step S127. If the process ends before the push operation reaches the lower limit $P_0$, the process proceeds from Steps S100 to S102 and S105.

If $P \geq P_0$ (Step S127), it is determined whether $P \geq Pt$ (Step S130). If $P < Pt$, the process returns to Step S100, and the count p is counted up in Step S125 while the push operation continues. If the push operation ends before the count P reaches the predetermined value Pt, the process proceeds from Step S100 to Step S102. In Step S102, it is determined whether $P_0 \leq P < Pt$. In this case, $P_0 \leq P < Pt$ is satisfied. Thus, it is determined that the push switch 6 is operated in a short key press, and the process goes to Step S132. If $P \geq Pt$ (Step S130), it is determined that the push switch 6 is operated in a long key press, and the process goes to Step S140.

In Step S140, the GRAVEL traveling mode is set, and the process goes to Step S150. In Step S132, it is determined whether the current traveling mode is the GRAVEL traveling mode. If the result is YES, the MUD/SNOW traveling mode is set (Step S142), and the process goes to Step S150. If the traveling mode is not the GRAVEL traveling mode, it is determined whether the current traveling mode is the MUD/SNOW traveling mode (Step S134). If the result is YES, the SAND traveling mode is set (Step S144), and the process goes to Step S150. If the current traveling mode is not the MUD/SNOW traveling mode, the process goes to Step S136.

In Step S136, it is determined whether the current traveling mode is the ROCK traveling mode. If the result is YES, the GRAVEL traveling mode is set (Step S140). If the result is NO, the process goes to Step S138. In Step S138, it is determined whether the actual arrangement Bp is the low-direct-connection 4WD arrangement. If the result is YES, the ROCK traveling mode is set (Step S148). If the results is NO, the GRAVEL traveling mode is set (Step S140). In Step S150, the count P is reset to zero (P=0), and the process returns to Step S10 in FIG. 5.

[3-2. Flow Chart for Display]

The process of displaying the drive mode and the traveling mode carried out by the display ECU 3 will now be described. The processes illustrated in FIGS. 7, 8, and 9 are simultaneously carried out, and count information is shared among these processes. The process for displaying the drive mode will now be described.

With reference to FIG. 7, in Step T10, the selected drive mode As and the actual arrangement Bp are acquired from the transfer ECU 1, and a count L described below is acquired from the process illustrated in FIG. 8, which is carried out simultaneously to the process illustrated in FIG. 7. In Step T20, switching of the selected drive mode As is determined. If switching is determined, the display content corresponding to the selected drive mode As is displayed in a flashing manner in Step T30. The process then goes to Step T40.

In Step T40, it is determined whether As=Bp. If the result is NO, the process returns to the start. In this case, only the indicators corresponding to the drive mode flash in the first area 41A of the display 40. Through the next cycle, information is acquired again in Step T10. If switching of the selected drive mode As is not determined, the process goes to Step T25, and it is determined whether the indicators for the drive mode are lighted. In this case, the process goes to Step T35 because the indicators for the drive mode are not continuously lighted but are flashing. In Step T35, it is determined whether the indicators for the drive mode are flashing. The process follows the YES route to Step T40.

That is, the steps from the switching of the selected drive mode As are repeated until As=Bp, and the indicators for the drive mode flash in the first area 41A. If As=Bp, the process goes to Step T50, and the indicators for the drive mode are continuously lighted. In Step T55, a count H is counted up by one (i.e., one is added to the current count H).

The count H is comparable to a timer for counting the display time of the drive mode. If the count H exceed a predetermined value $H_0$, it is determined that the first display time Cs1 has reached the end time for the display of the drive mode. The predetermined value $H_0$ corresponds to the first display time Cs1 and is preliminarily determined on the basis of the first display time Cs1 and the calculation cycle. A count L acquired in the process illustrated in FIG. 8 is comparable to a timer for counting the display time of the traveling mode. If the count L exceeds a predetermined value $L_0$, it is determined that the second display time Cs2 has reached the end time for the display of the traveling mode. The predetermined value $L_0$ corresponds to the second display time Cs2 and is preliminarily determined on the basis of the second display time Cs2 and the calculation cycle.

In Step T60, it is determined whether the count H is larger than the predetermined value $H_0$ ($H>H_0$). If $H\leq H_0$, the process returns to the start. In the next cycle, the process proceeds from Step T25 to Step T55 because the indicators for the drive mode on the display 40 are continuously lighted. In Step T55, the count-up of the count H is repeated. If the indicators for the drive mode continues to be lighted for the first display time Cs1, the process proceeds from Step T60 to Step T65 because $H>H_0$. In Step T65, it is determined whether the count L is zero (L=0). This determines whether the traveling mode is displayed in the second area 41B. That is, if the selected drive mode As is a drive mode other than the locked drive mode, the traveling mode is not displayed, and the count L remains zero. In this case, the process proceeds from Step T65 to Step T75.

If the traveling mode is displayed, and the count L is counted up, the process proceeds from Step T60 to Step T70. In Step T70, it is determined whether the count L is larger than the predetermined value $L_0$ ($L>L_0$). If $L\leq L_0$, the process returns to the start. In this case, the indicators for the drive mode are continuously lighted and the traveling mode is displayed on the display 40, and the display time for the drive mode is extended until $L>L_0$. If $L>L_0$, the process proceeds from Step T70 to Step T75. In Step T75, the counts H and L are reset to zero (H=0, L=0). In Step T80, the indicators for the drive mode and the traveling mode are simultaneously turned off, and the process returns to the start. If the selected drive mode As is not switched and the indicators for the drive mode are not continuously lighted or flashing, the process proceeds from Step T20 to Steps T25 and T35. The process then returns to the start.

The process for displaying the traveling mode will now be described. With reference to FIG. 8, in Step X10, the selected drive mode As and the actual arrangement Bp are acquired from the transfer ECU 1, and the count H is acquired through the process illustrated in FIG. 7, which is carried out simultaneously to the process illustrated in FIG. 8. In Step X20, it is determined whether the selected drive mode As is the 4HLc drive mode. If the selected drive mode As is the 4HLc drive mode, it is determined whether the actual arrangement Bp is the high-direct-connection 4WD arrangement (Step X30). If the actual arrangement Bp is not the high-direct-connection 4WD arrangement, the process goes to Step X150 in FIG. 9.

If the actual arrangement Bp is the high-direct-connection 4WD arrangement, it is determined whether the traveling mode is switched (Step X40). If the traveling mode is switched, counts L and M are reset to zero (L=0, M=0) (Step X45), and the updated traveling mode is displayed (Step X50). The count M is comparable to a timer for counting the time for displaying invalidity. If the count M exceeds a predetermined value $M_0$, it is determined that the time of displaying invalidity has ended. The time for displaying invalidity is preliminarily determined as a value equal to the display time Cs, for example.

In Step X60, the count L is counted up. In Step X65, it is determined whether $L>L_0$. If $L\leq L_0$, the process returns to the start. In the next cycle, if the selected drive mode As and the actual arrangement Bp remain the same and if the traveling mode is not switched, it is determined whether the traveling mode is displayed (Step X55). In this case, the process returns to Step X60 because the traveling mode is displayed, and the count L is counted up again.

The process then proceeds from Step X65 to Step X70 because the traveling mode continues to be displayed for the second display time Cs2 and $L>L_0$. In Step X70, it is determined whether H=0. This determines whether the indicators for the drive mode in the first area 41A are continuously lighted. If H=0, the process goes to Step X80. While the indicators for the drive mode are continuously lighted, the process proceeds from Step X70 to Step X75. In Step X75, it is determined whether $H>H_0$. If $H\leq H_0$, the process returns to the start. In this case, the indicators for the traveling mode and the drive mode are lighted on the display 40, and the display time for the traveling mode is extended until $H>H_0$.

If $H>H_0$, the counts H and L are reset to zero (H=0, L=0) (Step X80) and the indicators for the drive mode and the traveling mode are simultaneously turned off (Step X85). The process then returns to the start. If the traveling mode is not switched, and if the traveling mode is not displayed under the selected drive mode As being the 4HLc drive mode and the actual arrangement Bp being the high-direct-connection 4WD arrangement, the process returns to the start from Step X55.

If the selected drive mode As is not the 4HLc drive mode, it is determined whether the selected drive mode As is the 4LLc drive mode (Step X25). If the result is YES, it is determined whether the actual arrangement Bp is the low-direct-connection 4WD arrangement (Step X35). If the actual arrangement Bp is the low-direct-connection 4WD arrangement, steps similar to Steps X40 to X85 are carried out. If the actual arrangement Bp is not the low-direct-connection 4WD arrangement, the process goes to Step X150 in FIG. 9.

In Step X25, if the selected drive mode As is not the 4LLc drive mode, it is determined whether the previous selected drive mode As is the locked drive mode because the current selected drive mode As is not the locked drive mode (Step X90). That is, it is determined whether the selected drive mode As has been switched from the locked drive mode to a drive mode other than the locked drive mode in the current calculation cycle. If the result is YES, the current traveling mode is displayed (Step X100). Subsequently, it is determined whether the selected drive mode As and the actual arrangement Bp correspond to each other (Step X120).

Immediately after the selected drive mode As is switched, the selected drive mode As and the actual arrangement Bp do not correspond to each other. Thus, the process returns to the start, and in the next cycle, the process proceeds from Step X90 to Step X95. In Step X95, it is determined whether the traveling mode is displayed. In this case, the process returns to Step X120 because the traveling mode is displayed, and the steps are repeated until the selected drive mode As and the actual arrangement Bp correspond to each other. If the selected drive mode As and the actual arrangement Bp correspond to each other, the off-road invalidity display is displayed in Step X130. That is, if the selected drive mode As is switched from the locked drive mode to a drive mode other than the locked drive mode, the traveling mode is temporarily displayed, and then the invalidity of the off-road traveling mode is displayed.

In Step X132, the count M is counted up. In Step X135, it is determined whether $M>M_0$. If $M \le M_0$, the process returns to the start. In the next cycle, the process proceeds from Step X90 to Steps X95 and X105. In Step X105, it is determined whether the push switch 6 is operated. If the push switch 6 is operated, the count M is reset to zero (M=0) in Step X115. The process then returns to Step X130. That is, an announcement is displayed indicating that a push operation is invalidated in the selected drive mode As other than the locked drive mode. This announcement is displayed for a predetermined time (the invalidity time) in response to the resetting of the count M.

If the push switch 6 is not operated, the process goes to Step X125, and it is determined whether the off-road invalidity display is displayed. If it is displayed, count-up of the count M continues (Step X132). If $M>M_0$, the count M is reset to zero (M=0) (Step X140), and the off-road invalidity display is turned off. If the off-road invalidity display is not displayed, the process returns to the start from Step X125.

If the selected drive mode As is the locked drive mode and the actual arrangement Bp is not an arrangement corresponding to the selected drive mode As, the process continues to the steps in FIG. 9. In the first step in the process in FIG. 9, it is determined whether the actual arrangement Bp is the locked arrangement (Step X150). The process follows the YES route if the selected drive mode As is the 4HLc drive mode (As=4HLc) and the actual arrangement Bp is the low-direct-connection 4WD arrangement, or if the selected drive mode As is the 4LLc drive mode (As=4LLc) and the actual arrangement Bp is the high-direct-connection 4WD arrangement. In Step X155, it is determined whether the dial switch 5 has just been operated. If the selected drive mode As is switched in the current cycle, the count H is reset to zero (H=0) (Step X160) and the traveling mode is then displayed (Step X170).

In Step X180, the switching of the traveling mode is determined. If the traveling mode is not switched, Steps X200 to X225 (similar to Steps X60 to X85) are carried out. In Step X155, if the selected drive mode As is not switched in the current cycle, it is determined whether the traveling mode is displayed (Step X165). If the traveling mode is displayed, the process goes to X180. If the traveling mode is not displayed, the switching of the traveling mode is determined (Step X175). If the traveling mode is not switched, the process returns to the start. If the traveling mode is switched, the count L is reset to zero (L=0) (Step X185). In Step X200, the count L is counted up.

In Step X150, if the actual arrangement Bp is not a locked arrangement, it is determined whether a push operation is carried out (Step X230). If a push operation is carried out, the count M is reset to zero (M=0) and the off-road invalidity display is displayed (Steps X235 and X240). That is, the invalidity of the push operation carried out in the actual arrangement Bp of the 2WD or full-time 4WD arrangement is displayed. Subsequently, Steps X250 to X265 (similar to Steps X130 to X145) are carried out. If no push operation is carried out, it is determined whether the off-road invalidity display is displayed in Step X245. If it is displayed, the process goes to Step X250. If the off-road invalidity display is not displayed, the process returns to the start.

[4. Operation and Advantageous Effects]

The controller of the four-wheel drive vehicle described above includes the determiner 2a of the gateway ECU 2 that determines whether switching of the traveling mode is permitted on the basis of the drive mode selected at the dial switch 5 and the arrangement detected by the arrangement switch 8. When the setter 2b determines the switching is permitted, the traveling mode is set, whereas when the setter 2b determines the switching is not permitted, the current traveling mode is maintained. Thus, an appropriate traveling mode (off-road traveling mode) for off-road driving can be set. Accordingly, the traveling performance (for example, run through performance for off-road driving and stability for on-road driving) and safety of the four-wheel drive vehicle can be enhanced.

If the arrangement of the transfer device 13 is not the locked arrangement, the determiner 2a of the controller determines the switching of the traveling mode is not permitted regardless of the drive mode selected by the dial switch 5. This appropriately sets the traveling mode corresponding to the actual condition of the transfer device 13, and enhances safety.

The determiner 2a of the controller determines the switching of the traveling modes is permitted when the arrangement of the transfer device 13 is the locked arrangement and the drive mode selected by the dial switch 5 is the locked drive mode. That is, the switching of the traveling mode is permitted when the intent of the passenger coincides with the actual arrangement of the transfer device 13. This enhances the safety of the traveling state.

The determiner 2a of the controller determines the switching of the traveling modes is not permitted when the arrangement of the transfer device 13 is the locked arrangement and the drive mode selected by the dial switch 5 is not the locked drive mode. This maintains the current traveling mode even if the drive mode is instantaneously switched by the dial switch 5 from the locked drive mode to a drive mode other than the locked drive mode, for example. This prevents improper switching of the traveling mode and thus enhances the traveling performance and safety of the traveling state.

The transfer ECU 1 of the controller determines a drive mode is selected when the drive mode selected by the dial switch 5 continues for the first determination time D1 or longer and stores the drive mode as the selected drive mode As. This eliminates the influence of chattering of the dial switch 5 on the detected values. Similarly, the transfer ECU 1 determines an arrangement is detected when the arrangement switch 8 continues to detect the same arrangement for the second determination time D2 or longer and stores the arrangement as the actual arrangement Bp. This eliminates the influence of chattering or vibration on the detected values during switching of the arrangement switch 8. Thus, the determination precision of the determiner 2a and the control precision of the ECUs 2 to 4 can be enhanced.

The arrangement of the transfer device 13 according to this embodiment always passes through the high-direct-connection 4WD arrangement when shifting from the 2WD arrangement to the full-time 4WD arrangement, or vice versa (refer to the actual arrangement Bp between times $t_{41}$ to $t_{42}$ in FIG. 10). Thus, if the dial switch 5 switches one of the 2H and 4H drive modes to the other one, the time (time difference $\Delta D$) during which the drive mode and the actual arrangement do not correspond to each other is relatively prolonged. The controller according to this embodiment always confirms the actual arrangement when determining whether the switching of the traveling mode is permitted. Thus, even if the time difference $\Delta D$ is large, both traveling performance and safety can be enhanced.

The 4WD ECU 4 of the controller controls the drive operation assist device in accordance with the drive mode and the traveling mode. This enhances the traveling performance.

In this embodiment, the operation part that switches the drive mode is in the form of the dial switch 5, and the operation part that switches the traveling mode is in the form of the push switch 6 disposed near the dial switch 5. This facilitates the switching operation of the modes.

If the drive mode is switched from a drive mode other than the locked drive mode to the locked drive mode, the setter 2b of the controller sets the initial mode of the off-road traveling modes (GRAVEL traveling mode) upon shifting of the arrangement detected by the arrangement switch 8 to the locked arrangement. That is, the initial mode of the traveling modes is set upon entering of the locked drive mode at the moment the actual arrangement of the transfer device 13 shifts to the locked arrangement, not the moment the dial switch 5 is switched. This appropriately sets the off-road traveling mode. The traveling mode is automatically switched to the locked drive mode by the setter 2b through mere switching of the dial switch 5 to the locked drive mode. This reduces the burden on the passengers.

If the drive mode is the 4HLc or 4LLc locked drive mode and the traveling mode is the different mode (ROCK traveling mode), switching the locked drive mode through operation of the dial switch 5 causes the setter 2b of the controller to set the initial mode of the traveling modes. This appropriately sets an off-road traveling mode.

If the dial switch 5 is operated to switch to another locked drive mode in one of the 4HLc and 4LLc drive modes and the common mode (one of the GRAVEL, MUD/SNOW, and SAND traveling modes), the setter 2b maintains the traveling mode. This prevents improper switching of the traveling mode and appropriately sets an off-road traveling mode.

The setter 2b of the controller counts the duration of a push operation to the push switch 6 and determines whether the push operation is a short key press or a long key press on the basis of the duration. If the push operation is a short key press, the traveling mode is switched to a subsequent graded level, whereas if the push operation is a long key press, the initial mode of the traveling modes is set. In this way, the off-road traveling mode can be readily switched at a single operation part (push switch 6), and the operation is facilitated.

The setter 2b invalidates the off-road traveling mode (sets the traveling mode to the normal traveling mode) upon switching of the locked drive mode to a drive mode other than the locked drive mode by the dial switch 5. This enhances the traveling performance for on-road driving, too.

If the drive mode is the locked drive mode and the actual arrangement of the transfer device 13 is the locked arrangement corresponding to the locked drive mode, the display ECU 3 of the controller displays the current traveling mode set by the setter 2b on the display 40. This provides appropriate announcement (display) to the driver.

In this embodiment, the display 40 is a multi-information display that can display different information items (windows) at different times. The display 40 includes the window (mode display window) 41 that includes the display area (first area) 41A for the drive mode and the display area (second area) 41B for the traveling mode. Thus, the driver can confirm the drive mode and the traveling mode without moving his or her eyes too much. This enhances the visibility of the display.

When the drive mode switched by the dial switch 5 is the locked drive mode, the display ECU 3 of the controller displays the drive mode and the traveling mode on the mode display window 41 and simultaneously turns off the displays after a predetermined time. Thus, an appropriate announcement (display) can be provided to the driver without troublesome display.

In this embodiment, the display of the drive mode starts at the moment the arrangement corresponding to the drive mode coincides with the arrangement detected by the arrangement switch 8 after switching by the dial switch 5. The display of the traveling mode starts upon switching of the traveling mode by the setter 2b. That is, the display of the drive mode and the traveling mode starts upon switching of the actual arrangements or the traveling modes. This provides appropriate announcement (display) to the driver. If the traveling mode is switched during the display of the drive mode, the display time of the drive mode is extended to the end of the display of the traveling mode. This reduces any troublesome display.

The controller starts the display of the traveling mode upon switching of the drive modes by the dial switch 5 from one of the 4HLc and 4LLc drive modes to the other one. This quickly announces (displays) the traveling mode to the driver.

In such a case, the display time of the traveling mode is extended to the end of the display time of the drive mode, so that both displays can be simultaneously turned off. This eliminates any troublesome display by the driver.

In this embodiment, if the drive mode is switched by the dial switch 5, the display of drive mode flashes until the actual arrangement Bp coincides with the arrangement corresponding to the displayed drive mode. The drive mode display is continuously lighted after the arrangements coincide with each other. This switching announces (displays) the current condition of the vehicle 10 (the transfer device 13 in particular) to the driver.

If the drive mode is switched by the dial switch 5 from the locked drive mode to a drive mode other than the locked drive mode, the display controller 3 displays the traveling mode of that moment of switching. At the moment the actual arrangement Bp coincides with the arrangement corresponding to the drive mode, the display controller 3 displays the drive mode and switches the display of the traveling mode to the off-road invalidity display. That is, if the drive mode is switched from the 4HLc or 4LLc drive mode to the 2H or 4H drive mode, the traveling mode is temporarily displayed, and then the off-road invalidity display is displayed. This appropriately announces (displays) the drive mode and the invalidity of the off-road traveling mode to the driver.

In this embodiment, if a push operation is carried out in an actual arrangement Bp other than the locked arrangement, the invalidity of the off-road traveling mode is displayed. This provides an appropriate announcement to the driver in consideration of the actual condition of the transfer device 13.

[5. Others]

The present invention should not be limited to the embodiments described above and may be modified in various ways without departing from the scope of the invention.

The drive modes and the traveling modes according to the embodiments described above are mere examples. Some of the modes described above or modes other than those described above may be set. For example, the transfer device 13 may be of a type not including a sub-transmission mechanism 13E or not having a high-direct-connection 4WD arrangement between the 2WD and full-time 4WD arrangements.

The determiner 2a may have any configuration that determines whether the switching of the traveling mode is permitted or not on the basis of the drive mode selected by the dial switch 5 and the actual arrangement detected by the arrangement switch 8. Any conditions may be applied for determination of permitting or prohibiting (not permitting) the switching of the traveling mode. For example, if the actual arrangement Bp is not the locked arrangement, whether the switching of the traveling mode is permitted or not may be determined after confirming the drive mode selected by the dial switch 5.

The setter 2b may set the traveling mode in any manner other than that described above. For example, the normal traveling mode may be maintained upon switching of the drive mode other than the locked drive mode to the locked drive mode by the dial switch 5, and the initial mode of the traveling modes may be set in response to operation of the push switch 6. Alternatively, if the 4HLc and 4LLc drive modes are switched, the traveling mode may be constantly set at the initial mode of the traveling modes, or may be switched back to the previous traveling mode after long press of the push switch 6. The 4HLc and 4LLc drive modes may include only the common modes.

In this embodiment, the transfer ECU 1 stores (confirms) the selected drive mode As and the actual arrangement Bp through the first determination time D1 and the second determination time D2. Alternatively, the drive mode and the actual arrangement of the transfer device 13 may be confirmed without the two determination times D1 and D2. Alternative to the ECUs 2 to 4 carrying out control on the basis of the selected drive mode As and the actual arrangement Bp sent from the transfer ECU 1, the ECUs 2 to 4 may carry out control on the basis of information directly acquired from the dial switch 5 and the arrangement switch 8. In such a case, the drive mode and the actual arrangement may be confirmed without the two determination times D1 and D2.

In this embodiment, three drive operation assist devices, the ABS 31, the ASC 32, and the ATC 33 are provided. Alternatively, other systems may be provided instead of these three systems or in addition to these three systems. The content of the control over the drive operation assist devices by the 4WD ECU 4 should not be limited to that shown in Table 2.

The operation parts for switching the drive mode and the off-road traveling mode of the vehicle 10 may have any configuration other than that of the dial switch 5 and the push switch 6. The operation parts may be disposed in any arrangement other than the arrangements described above. Different traveling modes may be selected (switched) through any means other than a short key press or a long key press of the push switch 6.

The display 40 may be any display other than the multi-information display and may display any content in the traveling-mode window 41 other than that described above. For example, the display 40 may partially include a multi-information display area, or two displays may be provided for the drive mode and the traveling mode.

In this embodiment, various functions are distributed to the ECUs 1 to 4. Alternatively, other ECUs may be provided for the functions described above, or a single ECU may carry out comprehensive control.

REFERENCE SIGNS LIST 1 transfer ECU (transfer controller)
2 gateway ECU
2a determiner
2b setter
3 display ECU (display controller)
4 4WD ECU (system controller)
5 dial switch (first operation part)
6 push switch (second operation part)
8 arrangement switch (detector)
10 vehicle (four-wheel drive vehicle)
11 engine
12 transmission
13 transfer device
13E sub-transmission mechanism
13F center differential
13G switch mechanism
13H lock mechanism
31 ABS (drive operation assist device)
32 ASC (drive operation assist device)
33 ATC (drive operation assist device)

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A controller of a four-wheel drive vehicle provided with a transfer device comprising a lock mechanism that locks a center differential and a switch mechanism that switches between a two-wheel drive state and a four-wheel drive state, the transfer device distributing an output from an engine to front and rear shafts, the controller further comprising:
   a first operation part operated by a passenger to switch drive modes of a vehicle;
   a second operation part operated by the passenger to switch off-road traveling modes indicating traveling modes for off-road driving of the vehicle;
   a transfer controller that controls an arrangement of the transfer device in response to the drive mode selected by the first operation part;
   a detector that detects the arrangement of the transfer device;
   a determiner that determines whether a switching of the traveling modes is permitted or not based on the drive mode selected by the first operation part and the arrangement detected by the detector; and
   a setter that sets one of the traveling modes based on the arrangement detected by the detector and input operations to the first operation part and the second operation part when the determiner determines the switching of the traveling modes is permitted, and maintains the current traveling mode when the determiner determines the switching of the traveling modes is not permitted.

2. The controller according to claim 1, wherein,
   the drive modes include a locked drive mode for a four-wheel drive state in which the center differential is locked by the lock mechanism, and
   the determiner determines the switching of the traveling modes is not permitted in any of the drive modes selected by the first operation part when the arrangement detected by the detector is not a locked arrangement corresponding to the locked drive mode.

3. The controller according to claim 2, wherein the determiner determines the switching of the traveling modes is permitted when the arrangement detected by the detector is the locked arrangement and the drive mode selected by the first operation part is the locked drive mode.

4. The controller according to claim 3, wherein the determiner determines the switching of the traveling modes is not permitted when the arrangement detected by the detector is the locked arrangement and the drive mode selected by the first operation part is not the locked drive mode.

5. The controller according to claim 2, wherein the determiner determines the switching of the traveling modes is not permitted when the arrangement detected by the detector is the locked arrangement and the drive mode selected by the first operation part is not the locked drive mode.

6. The controller according to claim 1, wherein the transfer controller determines the drive mode is selected when the drive mode switched by the first operation part continues for a predetermined first determination time or longer, and determines the arrangement is detected when the same arrangement detected by the detector continues for a second determination time or longer, the second determination time being longer than the first determination time.

7. The controller according to claim 1, wherein,
the vehicle comprises a drive operation assist device that adjusts a braking force and a driving force of wheels in accordance with operation of the vehicle to assist a drive operation, and
the controller comprises a system controller that controls the drive operation assist device in accordance with the drive mode selected by the first operation part and the traveling mode set by the setter.

8. The controller according to claim 1, wherein,
the drive modes include a locked drive mode for a four-wheel drive state in which the center differential is locked by the lock mechanism, and
the setter sets an initial mode of the off-road traveling modes upon shifting of the arrangement detected by the detector from an arrangement other than a locked arrangement to the locked arrangement, when the drive mode is switched from a mode other than the locked drive mode to the locked drive mode by the first operation part.

9. The controller according to claim 8, wherein,
the vehicle comprises a sub-transmission mechanism that is connected to an output of a transmission and has a high-gear arrangement and a low-gear arrangement,
the locked drive mode includes a high-speed locked drive mode in which the sub-transmission mechanism is set in the high-gear arrangement and a low-speed locked drive mode in which the sub-transmission mechanism is set in the low-gear arrangement,
the off-road traveling modes include modes for the high-speed locked drive mode and modes for the low-speed locked drive mode, at least part of the modes for the low-speed locked drive mode being a different mode from at least part of the modes for the high-speed locked drive mode, and
the setter sets the traveling mode from the different mode to the initial mode of the high-speed locked drive mode when the low-speed locked drive mode is switched to the high-speed locked drive mode.

10. The controller according to claim 9, wherein,
the off-road traveling modes include at least one common mode for the high-speed locked drive mode and the low-speed locked drive mode, and
the setter maintains the common mode when one of the high-speed locked drive mode and the low-speed locked drive mode is switched to the other of the high-speed locked drive mode and the low-speed drive mode.

11. The controller according to claim 10, wherein,
the drive modes include a two-wheel drive mode for a two-wheel drive state and an unlocked drive mode for a four-wheel drive state in which the center differential is released,
the transfer device has a high-speed locked arrangement corresponding to the high-speed locked drive mode, the high-speed locked arrangement being arranged between a two-wheel drive arrangement corresponding to the two-wheel drive mode and an unlocked arrangement corresponding to the unlocked drive mode, and
the first operation part is operated by the passenger to switch the two-wheel drive mode, the unlocked drive mode, and the high-speed locked drive mode in this order.

12. The controller according to claim 11, wherein,
the drive modes include a low-speed locked drive mode for a four-wheel drive state in which the center differential is locked by the lock mechanism and the sub-transmission mechanism is set in the low-gear arrangement,
the first operation part is a dial switch operated by the passenger to switch the two-wheel drive mode, the unlocked drive mode, the high-speed locked drive mode, and the low-speed locked drive mode in this order, and
the second operation part is a push switch disposed adjacent to the first operation part.

13. The controller according to claim 8, wherein,
the second operation part is a push switch disposed adjacent to the first operation part,
the off-road traveling modes include multiple modes in accordance with types of off-roads, and
the setter switches the traveling mode to a next level of the sub-mode to set the sub-mode when a duration of a push operation for the push switch is less than a predetermined time, and sets the traveling mode to the initial mode when the duration is equal to or longer than the predetermined time.

14. The controller according to claim 8, wherein,
the vehicle comprises a display disposed in the interior of the vehicle, and
the controller comprises a display controller that instructs the display to display the current traveling mode set by the setter when the locked drive mode is currently selected by the first operation part and the arrangement detected by the detector is a locked arrangement corresponding to the locked drive mode.

15. The controller according to claim 14, wherein the display controller instructs the display to display invalidity of the off-road traveling modes when the second operation part is operated unless the arrangement detected by the detector is the locked arrangement.

16. The controller according to claim 8, wherein the transfer controller determines the drive mode is selected when the drive mode switched by the first operation part continues for a predetermined first determination time or longer, and determines the arrangement is detected when the same arrangement detected by the detector continues for a second determination time or longer, the second determination time being longer than the first determination time.

17. The controller according to claim 8, wherein,
the vehicle comprises a drive operation assist device that adjusts a braking force and a driving force of wheels in accordance with operation of the vehicle to assist a drive operation, and
the controller comprises a system controller that controls the drive operation assist device in accordance with the drive mode selected by the first operation part and the traveling mode set by the setter.

18. The controller according to claim 8, wherein the setter sets invalidity of the off-road traveling modes when the drive mode switches the locked drive mode to a drive mode other than the locked drive mode by the first operation part.

\* \* \* \* \*